United States Patent [19]
Goodrum et al.

[11] Patent Number: 6,073,196
[45] Date of Patent: Jun. 6, 2000

[54] USING COMMUNICATION CYCLES FOR CONNECTING AND DISCONNECTING DEVICES IN A COMPUTER SYSTEM

[75] Inventors: Alan L. Goodrum, Tomball; Raymond Y. L. Chow, Cypress, both of Tex.

[73] Assignee: Compaq Computer Corporation, Houston, Tex.

[21] Appl. No.: 08/885,110

[22] Filed: Jun. 30, 1997

Related U.S. Application Data

[63] Continuation-in-part of application No. 08/658,602, Jun. 5, 1996, Pat. No. 5,943,482, application No. 08/658,538, Jun. 5, 1996, and application No. 08/775,133, Dec. 31, 1996, Pat. No. 5,922,060.

[51] Int. Cl.[7] .................................................. G06F 13/00
[52] U.S. Cl. .............................................................. 710/103
[58] Field of Search ............................. 395/283; 710/103, 710/102, 101

[56] References Cited

U.S. PATENT DOCUMENTS

| | | |
|---|---|---|
| 4,835,737 | 5/1989 | Herrig et al. ............................ 395/283 |
| 5,247,619 | 9/1993 | Mutoh et al. . |
| 5,555,510 | 9/1996 | Verseput et al. ......................... 395/283 |
| 5,581,712 | 12/1996 | Herrmann ................................ 395/283 |
| 5,625,238 | 4/1997 | Ady et al. ................................ 307/147 |
| 5,629,836 | 5/1997 | Wright . |
| 5,671,368 | 9/1997 | Chan et al. .............................. 395/282 |
| 5,734,841 | 3/1998 | Shin et al. ............................... 710/103 |
| 5,768,541 | 6/1998 | Pan-Ratzlaff ............................ 395/283 |
| 5,781,744 | 7/1998 | Johnson et al. .......................... 395/283 |
| 5,784,576 | 7/1998 | Guthrie et al. ........................... 710/103 |
| 5,822,547 | 10/1998 | Boesch et al. ........................... 395/283 |
| 5,862,350 | 1/1999 | Coulson .................................. 710/103 |

*Primary Examiner*—Glenn A. Auve
*Attorney, Agent, or Firm*—Sharp, Comfort & Merrett, P.C.

[57] ABSTRACT

A computer system has a communication link (e.g., a bus) and a removable circuit card that is inserted into a connector. In association with a change in the electrical state (e.g., one or more signals being disconnected or connected) between the removable circuit card and the connector, at least a portion of a predetermined communication cycle is furnished to the communication link.

63 Claims, 23 Drawing Sheets

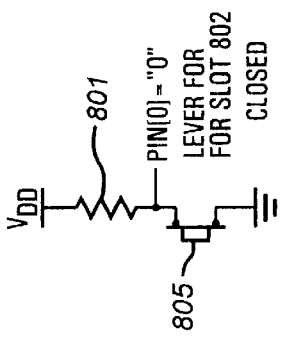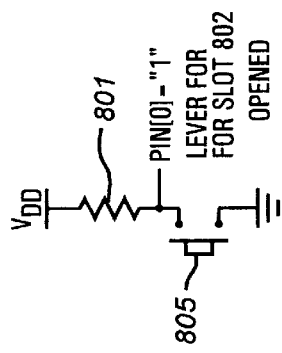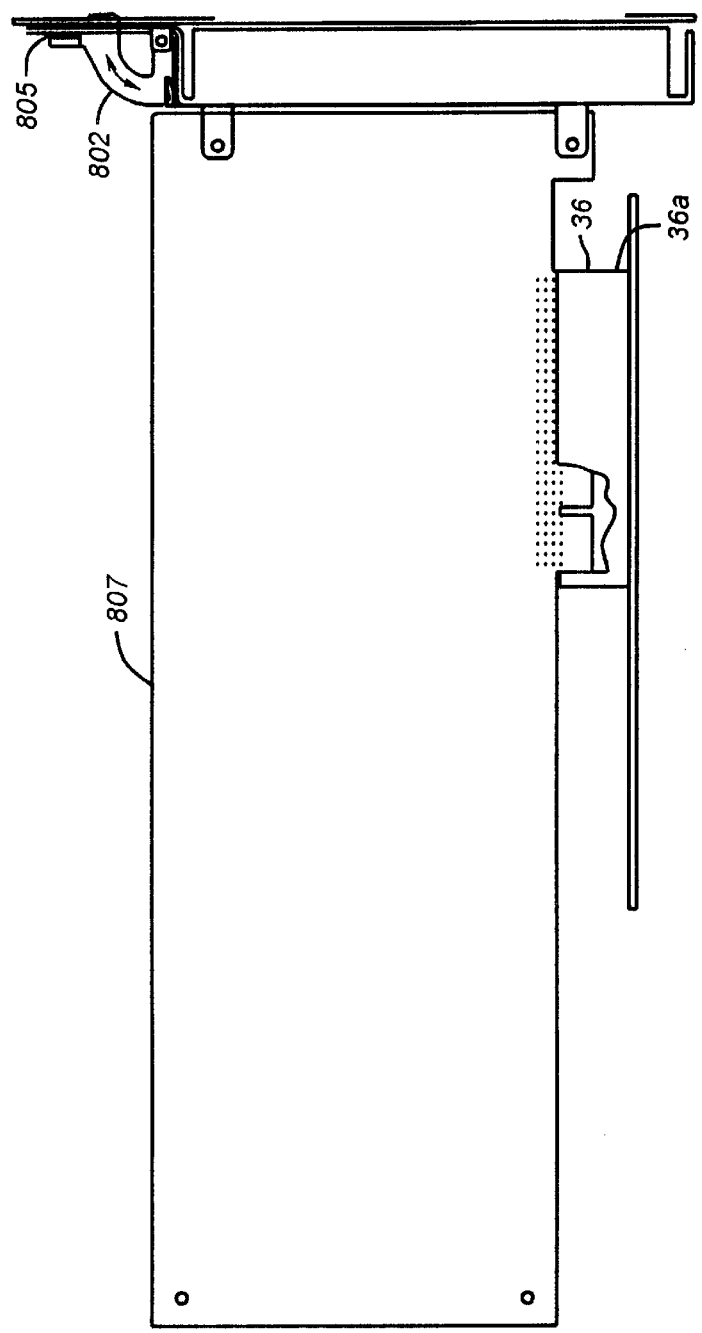

STOP_SCAN-(BYTE_PTR_EQUAL_CNT & GETTING_BYTE) OR ((BYTE[1] &
BIT[0] & CHECK_SWITCH_ONLY) OR (BYTE[4] & BIT[0]
& !CHECK_SWITCH_ONLY)) & !GETTING_BYTE))

USING COMMUNICATION CYCLES FOR CONNECTING AND DISCONNECTING DEVICES IN A COMPUTER SYSTEM

This application is a continuation-in-part of U.S. application Ser. Nos. 08/658,602, now U.S. Pat. No. 5,943,482, and 08/658,538, filed Jun. 5, 1996; and U.S. application Ser. No. 08/775,133, filed Dec. 31, 1996, now U.S. Pat. No. 5,922,060.

BACKGROUND

The invention relates to using communication cycles.

Computer systems typically have expansion card slots for receiving and electrically coupling expansion cards to an expansion bus of the computer system. The expansion bus may be one of several types, such as an Industry Standard Architecture (ISA) bus, an Extended Industry Standard Architecture (EISA) bus or a Peripheral Component Interconnect (PCI) bus.

The expansion bus typically is connected to many bus devices (e.g., bus devices introduced through the expansion card), each of which use a bus transaction, or bus cycle (e.g., a normal read cycle or burst read cycle), on the bus to transfer data between devices. A PCI bus device that initiates the bus cycle is known as an initiator, or master, and a PCI bus device that is targeted by the bus cycle is known as a target, or slave. Depending on the type of bus cycle, the initiator may receive (for a read operation) or furnish (for a write operation) data that is received (for a write operation) or furnished (for a read operation) by the target.

Only one initiator at a time may "own" the bus. To determine bus ownership, the computer system typically has a bus arbiter which receives requests from all bus devices (i.e., all potential initiators) that desire to initiate a cycle on the bus, and based on a predetermined priority scheme, the arbiter selectively grants access to the requesting bus devices. The arbiter indicates the grant to a particular bus device by activating a bus grant signal that is specifically assigned to the bus device. Once granted access to the bus, the bus device waits for any preexisting bus cycle to complete before initiating its own bus cycle.

SUMMARY

In general, in one aspect, the invention features a method for use with a computer system that has a communication link on which communication occurs using communication cycles. The computer system also has a removable circuit card that is inserted into a connector. The method includes changing an electrical connection state between the connector and the communication link, and in association with the changing, furnishing at least a portion of a predetermined communication cycle to the communication link.

Implementations of the invention may include one or more of the following. The communication cycle (e.g., a dummy cycle) may be furnished from a circuit which is separate from the circuit card. Changing the electrical connection state may include connecting the connector to the communication link (e.g., a bus). The connecting may include providing power to the connector, providing a clock signal to the connector or removing a reset signal from the connector. Changing the electrical connection state may include disconnecting the connector from the communication link. The disconnecting may include removing power from the connector, removing a clock signal from the connector or providing a reset signal to the connector.

The communication link may be a bus that is capable of being owned by one of more than one bus device, and the computer system may be capable of granting ownership of the bus to one of the bus devices. Once granted ownership of the bus, the computer system may monitor the bus for a predetermined sequence of signals and terminate ownership of the bus by one of the bus devices if the predetermined sequence of signals is not detected. The predetermined communication cycle may includes the predetermined sequence of signals. The computer system may have an arbiter that is configured to control access to the communication link, and use of the link may be requested from the arbiter. The furnishing may not occur until the arbiter grants use of the link. If the arbiter does not grant use of the link, the predetermined cycle may not be furnished until after a predetermined duration of time elapses from the requesting. The predetermined cycle may include an address, a command or data.

The computer system may have a bus device that is configured to furnish a cycle to the communication link when the bus is idle, and the predetermined communication cycle may include signals that keep the bus from being idle. The communication link may have a line for transmitting an address, and the line may have an unasserted logic level. The furnishing of the predetermined cycle may include selecting the address so that the line remains at the unasserted logic level, and providing the address to the line.

In general, in another aspect, the invention features a method for use with a computer system that has a bus on which communication occurs using communication cycles. The computer system also has a removable circuit card that is inserted into a connector. The method includes connecting a clock signal to the connector, and in association with the connecting the clock signal, furnishing a first predetermined communication cycle to the bus. Signals of the bus are connected to the connector, and in association with the connection of the signals, a second predetermined communication cycle is furnished to the bus. A reset signal is removed from the connector, and in association with the removing of the reset signal, a third predetermined communication cycle is furnished to the bus.

In general, in another aspect, the invention features a method for use with a computer system that has a bus and a removable circuit card inserted into a connector. The method includes disconnecting a clock signal from the connector, and in association with the disconnecting the clock signal, furnishing a first predetermined communication cycle to the bus. Signals of the bus are disconnected from the circuit card, and in association with the disconnection of the signals, a second predetermined communication cycle is furnished to the bus. A reset signal is connected to the connector, and in association with the connecting the reset signal, a third predetermined communication cycle is furnished to the bus.

In general, in another aspect, the invention features a computer system that has a communication link on which communication occurs using communication cycles. The computer system has a connector that has electrical contacts corresponding to the communication link and a removable circuit card that is inserted into the connector. The computer system also has a control circuit that is configured to change an electrical connection state between the connector and the communication link, and in association with the change, furnish at least a portion of a predetermined communication cycle to the communication link.

In general, in another aspect, the invention features a computer system that has a bus on which communication occurs using communication cycles and a connector having electrical contacts corresponding to the bus. The computer system has a removable circuit card that is inserted into the connector and a control circuit that is configured to connect a clock signal to the connector. The control circuit is also configured to connect one or more signals of the bus to the connector, and in association with the connection of the one or more signals, furnish a predetermined communication cycle to the bus. The control circuit is also configured to disconnect a reset signal from the connector, and in association with the disconnection of the reset signal, furnish another predetermined communication cycle to the bus.

In general, in another aspect, the invention features a computer system that has a bus on which communication occurs using communication cycles and a connector having electrical contacts corresponding to the bus. The computer system has a removable circuit card that is inserted into the connector and a control circuit that is configured to disconnect a clock signal from the connector. The control circuit is also configured to disconnect one or more signals of the bus from the connector, and in association with the disconnection of the one or more signals, furnish a predetermined communication cycle to the bus. The control circuit is also configured to connect a reset signal to the connector.

Among the advantages of the invention are one or more of the following. The control circuit maintains control of the bus during selected portions of the power up and power down sequences. The occurrence of glitches on the bus is minimized when the connector is being powered up or powered down. When dummy cycles are furnished, other bus devices (besides the bus devices being powered up or down) assume a real bus cycle is present on the bus. Other bus devices are kept off the bus when the connector is being powered up or down. Transitions of logic levels on the bus are minimized. Power is conserved. Electromagnetic interference is reduced.

Other advantages and features will become apparent from the following description and from the claims.

DESCRIPTION

FIG. 5 is a side view of an expansion card inserted into an expansion card slot.

FIGS. 6 and 7 are electrical schematic diagrams of lever circuitry.

In the ensuing description and in the figures, all signal mnemonics followed or proceeded by a "#", "_", or "!" signify inverted logic states.

Figure 1:
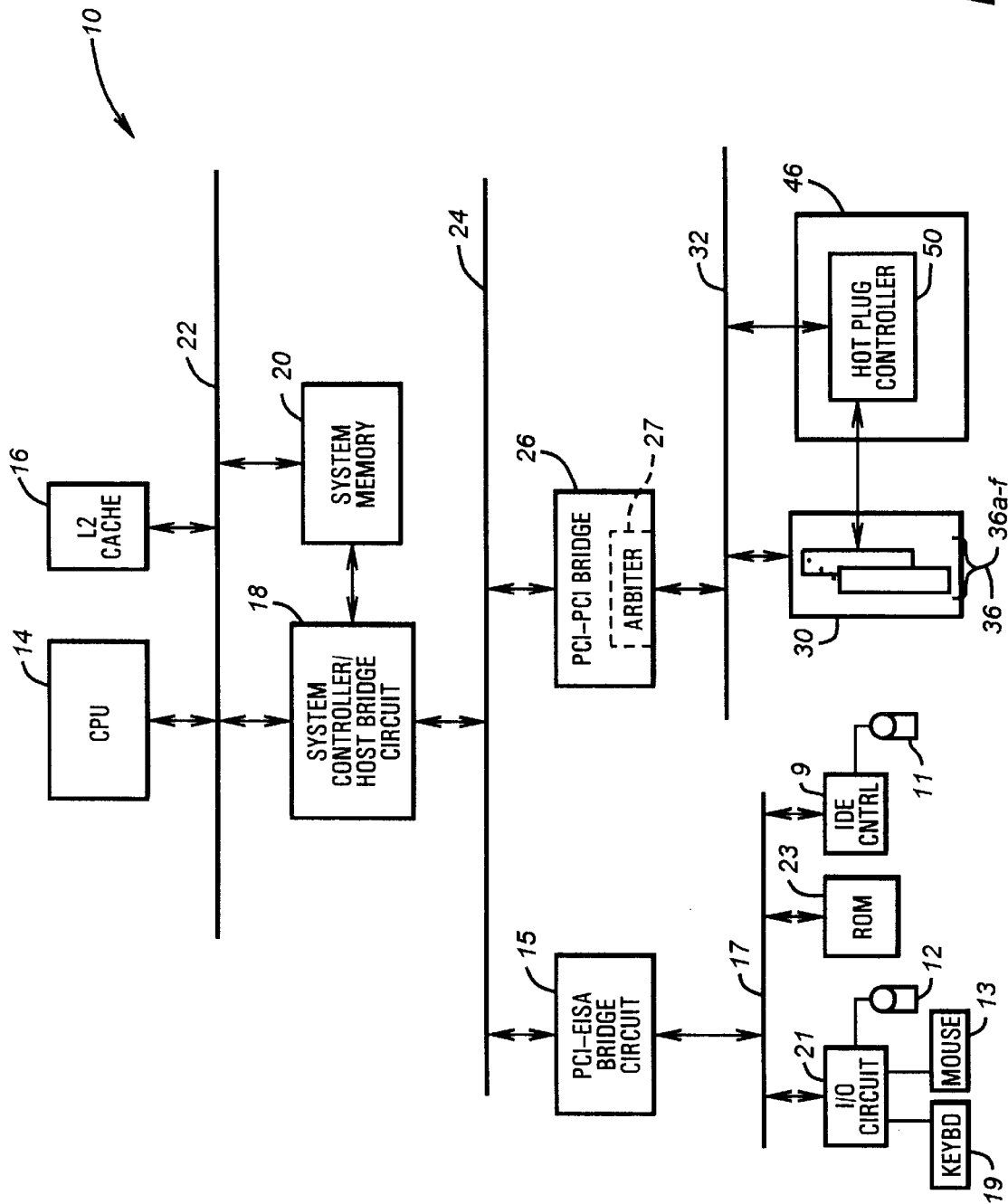
FIG. 1 is a block diagram of a computer system.
Figure 4:
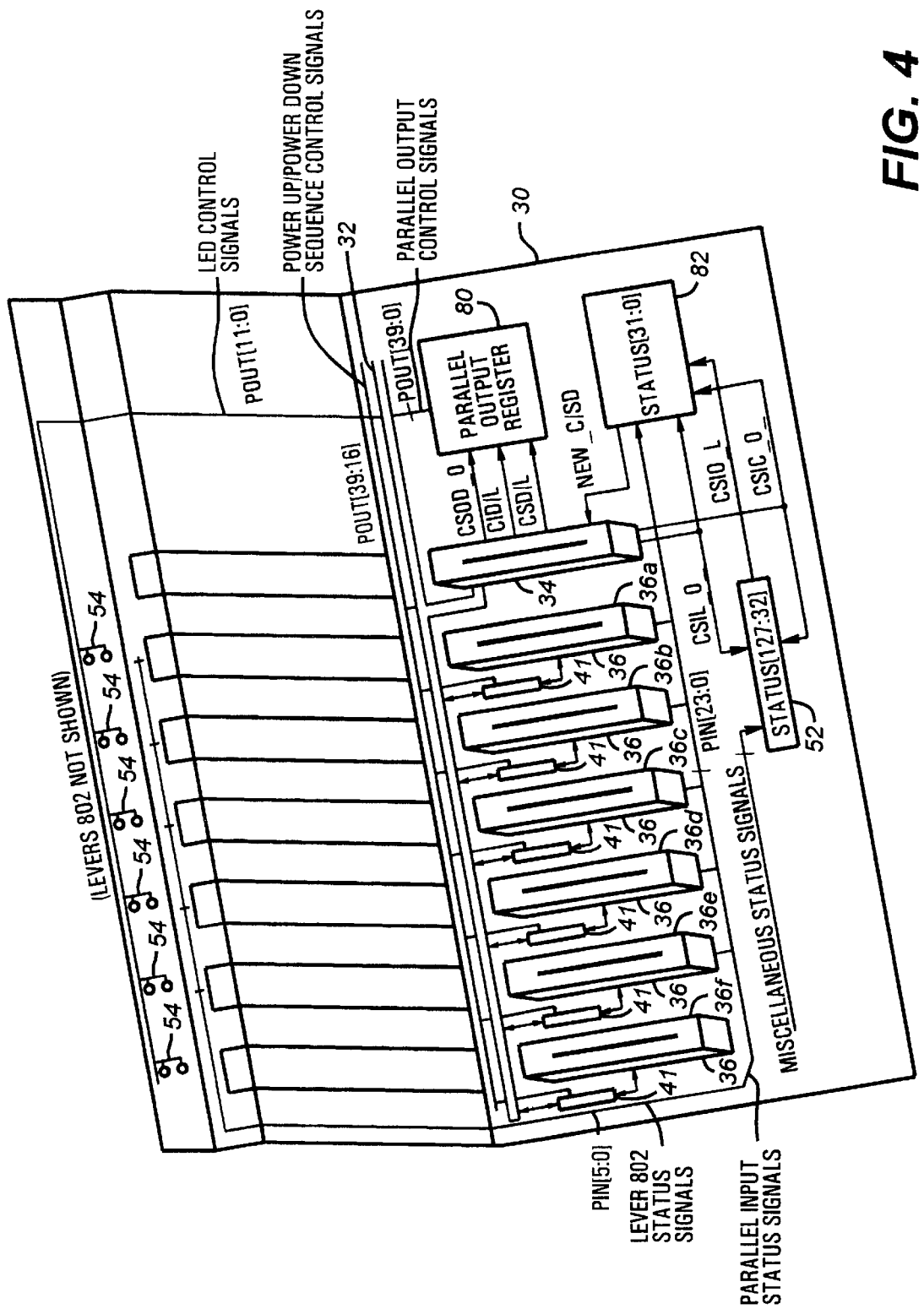
FIG. 4 is a perspective view of the expansion card slots of FIG. 1.

As shown in FIGS. 1, 4 and 5, a computer system 10 has six hot plug card connectors, or slots 36 (slots 36a–f), of a card platform 30 in which conventional expansion cards 807 can be inserted and removed (i.e., hot plugged) while the computer system 10 remains powered up. Six mechanical levers 802 are used to selectively secure (when closed, or latched) the expansion cards 807 that are inserted into corresponding hot plug slots 36. For purposes of removing or inserting the expansion card 807 into one of the slots 36, the corresponding lever 802 must be opened, or unlatched, and as long as the lever 802 is opened, the corresponding slot 36 remains powered down. When the lever 802 is closed, the corresponding card 809 may then be powered up (described below). When powered up, the slots 36 electrically connect cards 807 that are inserted to a Peripheral Component Interconnect (PCI) bus 32 of the computer system 10.

A hot plug controller 50 (connected to the bus 32) selectively powers up and down the slots 36. To prevent the corruption of a bus cycle on the bus 32 when one of the slots 36 is being powered up or down, the hot plug controller 50 acquires control of the bus 32 (i.e., owns the bus 32) during selected portions of these events. Because the controller 50 owns the bus 32, bus cycles associated with other bus devices (connected to the bus 32) are not interrupted or corrupted due to the propagation of connection/disconnection glitches down to the bus 32. The hot plug controller 50 acquires the bus 32 using conventional arbitration request and grant lines which allows preexisting bus cycles to terminate in an orderly fashion. To maintain control of the bus 32 after the grant, the controller 50 furnishes (i.e., initiates and completes) pseudo, or dummy bus cycles 200 (FIGS. 2 and 3), on the bus 32.

The dummy bus cycles 200 are not used for passing data via the bus 32 (like a real bus cycle), but rather, each dummy bus cycle 200 is used to simulate a real bus cycle so that no other bus device may acquire the bus 32 during the selected portions of the power up and power down sequences. In accordance with the PCI rules of arbitration, an arbiter 27 (part of the PCI-PCI bridge circuit 26) can grant ownership of the bus 32 to another bus device before the current owner of the bus 32 (i.e., the current bus master) has completed furnishing its own cycles on the bus 32. This other bus device waits until the bus 32 becomes idle before acquiring the bus 32 and furnishing its cycles on the bus 32. Without the dummy bus cycles 200, the controller 50 may lose ownership of the bus 32 due to the idle state of the bus 32. However, as a result of the dummy bus cycles 200, the controller 50 maintains ownership of the bus 32.

The controller 50 functions as both the initiator and the target for each dummy bus cycle 200. Functioning as the initiator, the controller 50 furnishes a memory cycle to a pseudo address only recognized by the controller 50. To accomplish this, basic input/output system (BIOS) code executed from a read only memory (ROM) 23 (FIG. 1) assigns a unique base address range to the hot plug controller

50. Functioning as the target, the controller 50 claims the memory cycle. After a predetermined delay, the controller 50 completes the transaction. However, data is not stored by the controller 50.

Figure 2:
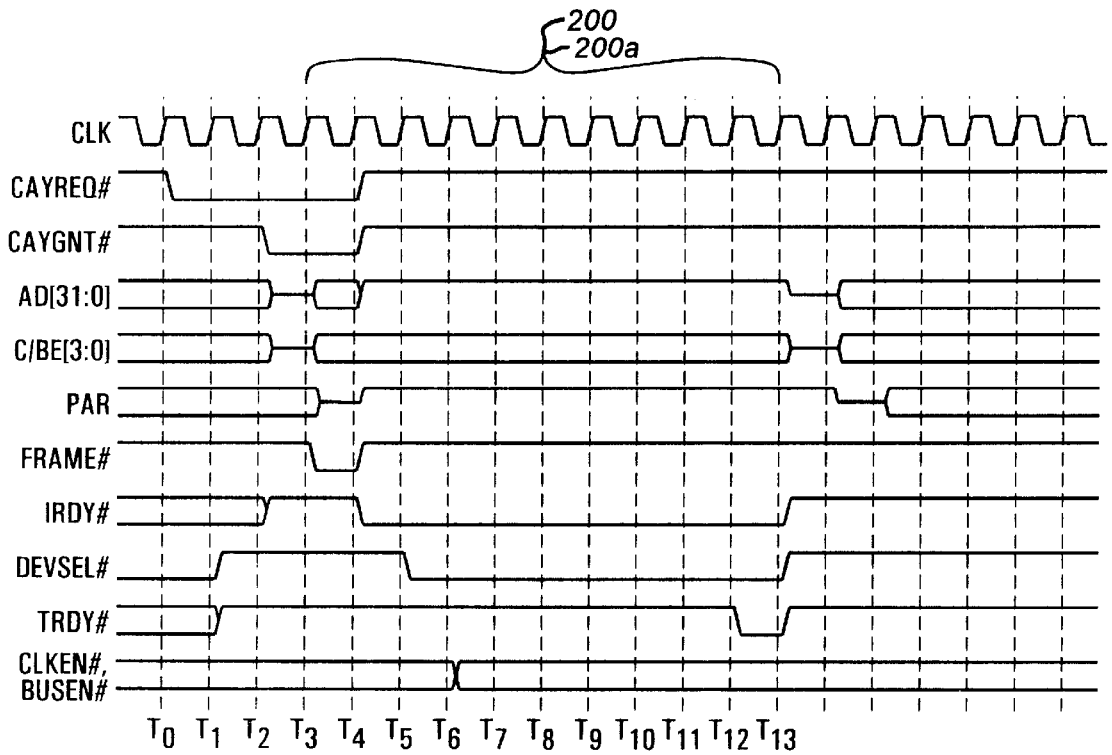
FIGS. 2 and 3 are timing diagrams of dummy bus cycles.
Figure 3:
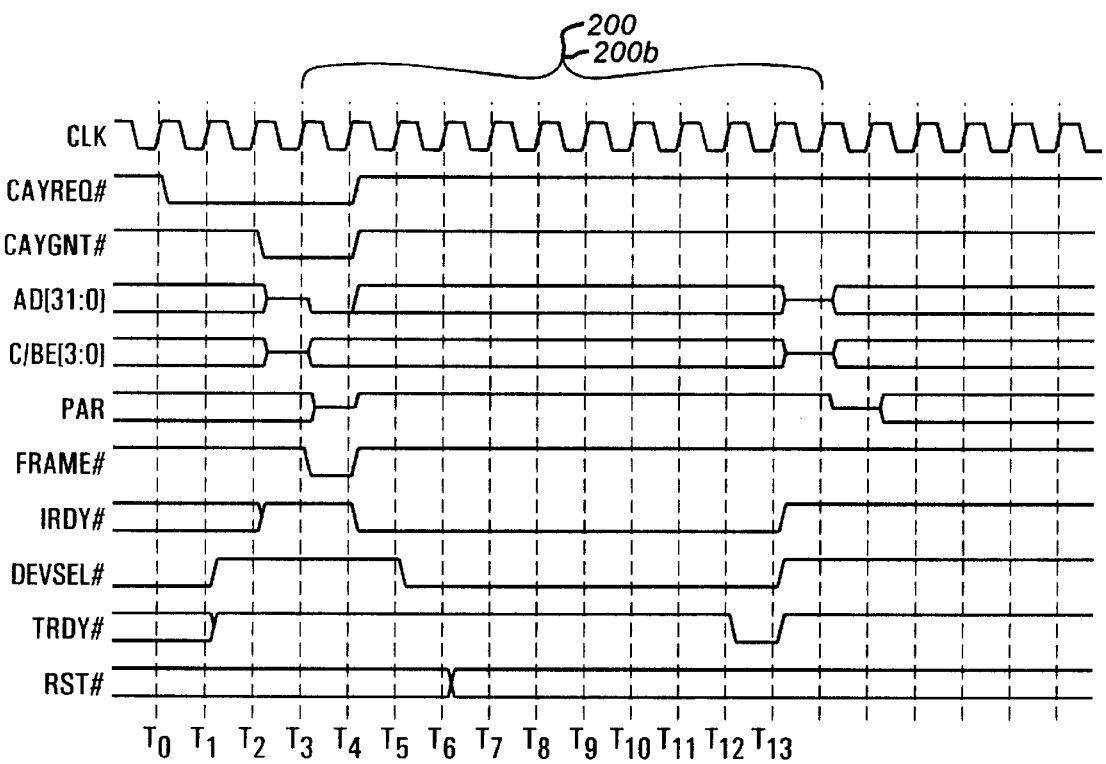

Referring to FIGS. 2 and 3, the hot plug controller 50 requests control of the bus 32 by asserting (at time T0) a PCI request signal CAYREQ# assigned to the controller 50. Subsequently, at time T2, the arbiter 27 grants the controller 50 access to the bus 32 by asserting a PCI grant signal CAYGNT# assigned to the controller 50. After the bus 32 has been granted (at time T3) to the controller 50, the controller 50 begins the dummy bus cycle 200 by asserting the PCI FRAME# signal, which indicates, by its assertion, that both a command and an address for the dummy bus cycle 200 are present on the bus 32.

After the arbiter 27 deasserts the grant signal CAYGNT# (at time T4), the arbiter 27 may grant the bus 32 to the next future bus owner. This future bus owner monitors the bus 32 for an idle state to determine when the controller 50 has finished using the bus 32. For example, the future bus owner may monitor the bus 32 to determine if an initiator ready signal IRDY# or PCI FRAME# signal has been asserted by the controller 50. Either the IRDY# signal or the FRAME# signal is used to indicate, by its assertion, that a bus cycle is in progress on the bus 32. If the IRDY# or FRAME# signal is not asserted by the time the arbiter 27 deasserts the grant signal CAYGNT#, then the future bus owner can furnish a cycle on the bus 32. To prevent this from occurring, the controller 50 asserts the FRAME# signal and then the IRDY# signal which allows the controller 50 to maintain control of the bus 32. Besides asserting the IRDY# signal at time T5, the controller asserts the device selection signal DEVSEL# to claim the transaction on the bus 32. As another example, the future owner may monitor the bus 32 for the assertion of the PCI FRAME# signal. At time T5, the controller 50 asserts the device selection signal DEVSEL# to claim the transaction on the bus 32.

To extend the duration of the dummy bus cycle 200, the controller 50 introduces wait states by waiting until time T12 to assert a target ready signal TRDY# to indicate the readiness of the controller 50 (i.e., the target) to complete transaction. Once the signal TRDY# is asserted, the dummy bus cycle 200 is completed in one PCI clock signal (i.e., at time T13). Thus, the duration of the dummy bus cycle 200 is ten clock cycles (from time T3 until time T13).

When the lever 802 that secures the expansion card 807 to its slot 36 is opened, the computer system 10 senses this occurrence and powers down the card 807 (and corresponding slot 36) before the card 807 can be removed from the corresponding slot 36. Slots 36 that are powered down, like other slots 36 not holding cards 807, remain powered down until software of the computer system 10 selectively powers up the slots 36.

A card 46 (FIG. 1) inserted into a card slot 34 (See FIG. 4) has the hot plug controller 50 which monitors the securement status (open or closed) of the levers 802 and powers down any card 807 (and corresponding slot 36) that is not secured by its lever 802. Software of the computer system 10 can also selectively power down any one of the slots 36. The controller 50 may alternatively be hardwired to the bus 32.

The cards 807 are powered up through a power up sequence and powered down through a power down sequence. In the power up sequence, power is first supplied to the card 807 being powered up (while the card 807 is held in reset), and thereafter, a PCI clock signal (from the PCI bus 32) is furnished to the card 807 being powered up. The reset signal for the card 807 being powered up is then negated which brings the card 807 out of reset, and the card 807 sees an idle bus 32 since the communication lines of the bus 32 are not yet connected. Lastly, remaining PCI bus communication lines (e.g., address and data lines) of the card 807 are coupled to corresponding lines of the PCI bus 32, and the card 807 then sees the middle of a dummy cycle 200.

In other embodiments, in the power up sequence, the bus communication lines are connected to the card 807 before the card 807 is reset. For this arrangement, the dummy bus cycle 200 is used to place the bus 32 in a near idle state. When the card 807 comes out of reset, the FRAME# is deasserted and only the IRDY# signal is asserted. Thus, from the perspective of the newly powered up card 807 coming out of reset, this condition approximates an idle bus.

The power up sequence allows the circuitry of the card 807 being powered up to become fully functional with the PCI clock signal before the remaining PCI bus communication lines are connected to the card 807. The controller 50 arbitrates for and acquires, or owns, the bus 32 when the PCI clock signal and PCI communication lines are connected to the card 807 and when the card 807 is brought out of reset. When the controller 50 owns the bus 32, the controller 50 furnishes a dummy cycle 200. Because the controller 50 has control of the PCI bus 32 during these portions of the power up sequence, potential glitches on the PCI bus 32 from the power up sequence do not disturb operations of other cards 807 that are already powered up.

In the power down sequence, the controller 50 arbitrates and acquires the bus 32 when the card 807 is placed in reset, when the PCI bus communication lines of the card 807 being powered down are disconnected from the card 807, and when the PCI clock signal is disconnected from the card 807. During the power down sequence, each time the controller 50 acquires, or owns, the bus 32, the controller 50 furnishes a dummy bus cycle 200 to the bus 32. Each time the controller 50 owns the bus 32, potential glitches on the bus 32 from the power down sequence are prevented from disturbing operations of the other cards 807 that remain powered up.

The controller 50 is constructed to furnish one of two types (type A or type B) of dummy cycles 200. For a type A dummy bus cycle 200a, the address and data furnished to the bus 32 is representative of "FFFF_FFFFh" (where the suffix "h" indicates a hexadecimal representation) which keeps the address data lines of the bus 32 at their logic one state. Since the communication lines of the card 807 are unbiased also (i.e., since no transfer of energy occurs across switches connecting the communication lines of the card 807 to the communication lines of the bus 32), switching noise (e.g., electromagnetic interference generated by metal-oxide-semiconductor field-effect-transistors (MOSFETs)) associated with logic level transitions on the bus 32 is minimized. In the dummy bus cycle 200b (the type B dummy cycle), the address and data furnished to the bus 32 is representative of "0000_000h."

The dummy bus cycle 200b is used in other embodiments when, during the power up sequence, the communication lines of the bus 32 are connected to the card 807 before the card 807 is brought out of reset. In these embodiments, the hot plug controller 50 might respond to the dummy bus cycle 200 if the card 807 detects a glitch on the FRAMES signal. To prevent this, the address and data furnished by the dummy cycle 200a is representative of an address (i.e., "0000_0000h") not recognized by the card 807. Thus, regardless of which portion (i.e., data or address) of the dummy bus cycle 200b is present on the bus 32 when the card 807 comes out of reset, the card 807 does not respond.

Because the slots 36 may be either thirty-two bit or sixty-four bit slots, this status must be provided to the newly powered up card 807 through use of the PCI signal REQ64#. System logic (not shown) of the computer system 10 informs the card 807 (during the power up sequence) whether or not the slot 36 is a sixty-four bit slot by asserting (to indicate a sixty-four bit slot) or deasserting (to indicate a thirty-two bit slot) a slot specific signal called REQ64# for at least ten PCI clock cycles before deasserting the reset signal that is received by the card 807.

Besides the above-described hot plug system, the computer system 10 (FIG. 1) also includes a central processor unit (CPU) 14 and a level two (L2) cache 16, which are both coupled to a local bus 22. A system controller/host bridge circuit 18 interfaces the local bus 22 to a primary Peripheral Component Interconnect (PCI) bus 24 and controls access to a system memory 20 (coupled to the local bus 22). The PCI-PCI bridge circuit 26 controls access between the primary PCI bus 24 and the secondary PCI bus 32. A PCI-Extended Industry Standard Architecture (EISA) bridge circuit 15 interfaces the primary PCI bus 24 to an EISA bus 17. An input/output (I/O) circuit 21, a read only memory (ROM) 23 and an Intelligent Device Electronics (IDE) controller 9 are all coupled to the EISA bus 17. The I/O circuit 21 receives input from a keyboard 19 and a mouse 13 and controls operation of a floppy disk drive 12. The IDE controller 9 controls operation of a hard disk drive 11.

Referring to FIG. 4, the controller 50 controls the power up and power down sequences of the slots 36 through twenty-four control signals POUT[39:16]. The control signals POUT[39:16] are a subset of forty output control signals POUT[39:0] generated by the controller 50. The control signals POUT[39:16] are latched versions of slot bus enable signals BUSEN#[5:0], slot power enable signals PWREN[5:0], slot clock enable signals CLKEN#[5:0] and slot reset signals RST#[5:0], all internal signals of the controller 50, further described below. The control signals POUT[39:0] and their relationship to the signals BUSEN# [5:0], PWREN[5:0], CLKEN#[5:0] and RST#[5:0] are described in the following table:

PARALLEL OUTPUT CONTROL SIGNALS (POUT[39:0])

| SIGNAL POSITION | DESCRIPTION | ASSOCIATED CONTROL SIGNALS | WHEN SIGNAL IS ACTIVE |
|---|---|---|---|
| 0–11 | Control signals for LEDs 54 | | |
| 12–15 | General purpose output signals | GPOA[3:0] | |
| 16 | Reset signal for slot 36a | (RST#[0]) | Low |
| 17 | Reset signal for slot 36b | (RST#[1]) | Low |
| 18 | Reset signal for slot 36c | (RST#[2]) | Low |
| 19 | Reset signal for slot 36d | (RST#[3]) | Low |
| 20 | Reset signal for slot 36e | (RST#[4]) | Low |
| 21 | Reset signal for slot 36f | (RST#[5]) | Low |
| 22 | Clock enable signal for slot 36a | (CLKEN#[0]) | Low |
| 23 | Clock enable signal for slot 36b | (CLKEN#[1]) | Low |
| 24 | Clock enable signal for slot 36c | (CLKEN#[2]) | Low |
| 25 | Clock enable signal for slot 36d | (CLKEN#[3]) | Low |
| 26 | Clock enable signal for slot 36e | (CLKEN#[4]) | Low |
| 27 | Clock enable signal for slot 36f | (CLKEN#[5]) | Low |
| 28 | Bus enable signal for slot 36a | (BUSEN#[0]) | Low |
| 29 | Bus enable signal for slot 36b | (BUSEN#[1]) | Low |
| 30 | Bus enable signal for slot 36c | (BUSEN#[2]) | Low |
| 31 | Bus enable signal for slot 36d | (BUSEN#[3]) | Low |
| 32 | Bus enable signal for slot 36e | (BUSEN#[4]) | Low |
| 33 | Bus enable signal for slot 36f | (BUSEN#[5]) | Low |
| 34 | Power enable signal for slot 36a | (PWREN[0]) | High |
| 35 | Power enable signal for slot 36b | (PWREN[1]) | High |
| 36 | Power enable signal for slot 36c | (PWREN[2]) | High |
| 37 | Power enable signal for slot 36d | (PWREN[3]) | High |
| 38 | Power enable signal for slot 36e | (PWREN[4]) | High |
| 39 | Power enable signal for slot 36f | (PWREN[5]) | High |

Figure 8:
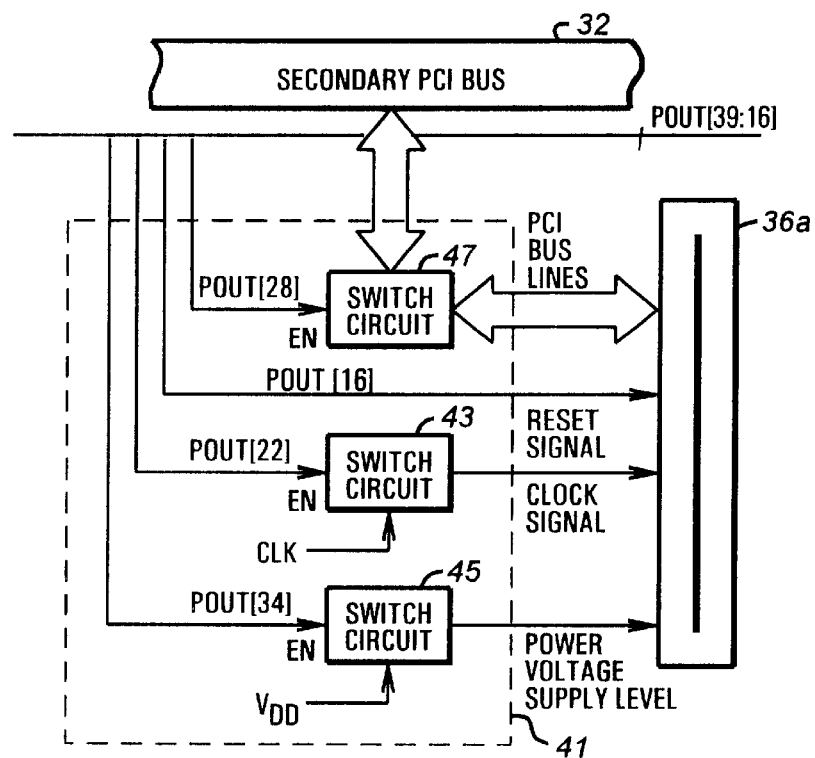
FIG. 8 is a schematic diagram illustrating circuitry for each expansion card slot.

Each hot plug slot 36 has associated switch circuitry 41 for connecting and disconnecting the slot 36 to and from the PCI bus 32. The switch circuitry 41 for each slot 36 receives four of the control signals POUT[39:16]. As an example, for the slot 36a, when the control signal POUT[28] (FIG. 8) is asserted, or low, the slot 36a is connected to the bus signal lines of the PCI bus 32 by a switch circuit 47. When the control signal POUT[28] is deasserted, or high, the slot 36a is disconnected from the bus signal lines of the PCI bus 32.

When the control signal POUT[22] is asserted, or low, the slot 36a is connected to a PCI clock signal CLK through a switch circuit 43. When the control signal POUT[22] is deasserted, or high, the slot 36a is disconnected from the clock signal CLK.

When the control signal POUT[34] is asserted, or high, the slot 36a is connected to a card voltage supply level $V_{DD}$ through a switch circuit 45. The voltage supply $V_{DD}$ is a supply voltage furnished by one of the voltage supply lines (i.e., a +12V, −12V, +5V or 3.3V line) of the bus 32. When the control signal POUT[34] is deasserted, or low, the slot 36a is disconnected from the card voltage supply level $V_{DD}$.

When the control signal POUT[16] is asserted, or low, the slot 36a is reset and when the control signal POUT[16] is deasserted, or high, the slot 36a comes out of the reset state.

The controller 50 may selectively monitor up to one hundred twenty-eight (sixteen bytes) of latched status signals STATUS[127:0] furnished (via a serial signal called NEW_CSID) by the card platform 30. The status signals STATUS[127:0] form a "snapshot" of selected conditions of the card platform 30. The status signals STATUS[127:0] include six status signals STATUS[5:0] which indicate the securement status (opened or closed) of each of the levers 802. The controller 50 monitors the status signals STATUS [31:0] for changes in their logical voltage levels. The controller 50 serially shifts the status signals STATUS [127:32] into the controller 50 when instructed to do so by the CPU 14.

The controller 50 serially receives the status signals STATUS[127:0], least significant signal first, via the serial data signal NEW_CSID. The data signal NEW_CSID is furnished by the serial output of the thirty-two bit, parallel input shift register 82 located on board the card platform 30 along with the slots 36.

The register 82, through its parallel inputs, receives twenty-four parallel status signals PIN[23:0], four associated with each of the hot plug slots 36, that are included in the thirty-two least significant status signals STATUS[31:0]. When the status indicated by one or more of the status signals STATUS[31:0] changes (the logical voltage level changes), the controller 50 generates an interrupt request to the CPU 14 by asserting, or driving low, an interrupt request signal SI_INTR# which is furnished to the PCI bus 32. The status signals PIN[23:0] include two PCI card presence signals (PRSNT1# and PRSNT2#) associated with each slot 36.

Six status signals PIN[5:0], corresponding to their latched versions, status signals STATUS[5:0], indicate the securement, or engagement, status (open or closed) of each the levers 802. Referring to FIGS. 6 and 7, six sliding switches 805 are actuated by the movement of their corresponding levers 802 and are used to electrically indicate the securement status of the corresponding lever 802. Each switch 805 has a first terminal coupled to ground and a second terminal furnishing the corresponding one of the status signals PIN[5:0]. The second terminal is coupled to a supply voltage level $V_{DD}$ through one of six resistors 801.

If one of the levers 802 opens and the card 807 secured by the lever 802 becomes unsecured, the corresponding one of the status signals PIN[5:0] is asserted, or driven high. As an example, for the slot 36a, the status signal PIN[0] is deasserted, or driven low, when the corresponding lever 802 is closed. When the lever 802 for the slot 36a is opened, the status signal PIN[0] is asserted, or driven high.

The register 82 also receives a serial stream of latched status signals STATUS[127:32] that do not cause interrupts when the logical voltage level of one of the signals STATUS[127:32] changes. The status signals STATUS[127:32] are formed by the sixteen bit shift register 52 located on board the card platform 30 with the slots 36. The shift register 52 receives status signals at its parallel inputs and latches the status signals STATUS[127:32] when instructed to do so by the controller 50. The shift register 52 serializes the status signals STATUS[127:32] and furnishes the signals STATUS[127:32] to the serial input of the register 82 via a serial data signal CSID_I.

When instructed by the controller 50, the register 82 latches status signals PIN[23:0], forms the status signals STATUS[31:0], furnishes the status signals STATUS[31:0] and furnishes a byte or more of the status signals STATUS[127:32] (when requested by the CPU 14), in a least significant signal first fashion, to the controller 50 via the serial data signal NEW_CSID. The status signals STATUS[127:0] are described by the following table:

STATUS [127:0]

| BIT | DESCRIPTION |
|---|---|
| 0 | Lever 802 status signal for slot 36a (PIN[0]) |
| 1 | Lever 802 status signal for slot 36b (PIN[1]) |
| 2 | Lever 802 status signal for slot 36c (PIN[2]) |
| 3 | Lever 802 status signal for slot 36d (PIN[3]) |
| 4 | Lever 802 status signal for slot 36e (PIN[4]) |
| 5 | Lever 802 status signal for slot 36f (PIN[5]) |
| 6 | Reserved for lever 802 status signal for additional hot plug slot |
| 7 | Reserved for lever 802 status signal for additional hot plug slot |
| 8 | Power fault status for slot 36a (PIN[18]) |
| 9 | Power fault status for slot 36b (PIN[19]) |
| 10 | Power fault status for slot 36c (PIN[20]) |
| 11 | Power fault status for slot 36d (PIN[21]) |
| 12 | Power fault status for slot 36e (PIN[22]) |
| 13 | Power fault status for slot 36f (PIN[23]) |
| 14 | Reserved for power fault status for additional hot plug slot 36 |
| 15 | Reserved for power fault status for additional hot plug slot 36 |

-continued

STATUS [127:0]

| BIT | DESCRIPTION |
|---|---|
| 16 | PRSNT2# signal for slot 36a (PIN[6]) |
| 17 | PRSNT2# signal for slot 36b (PIN[7]) |
| 18 | PRSNT2# signal for slot 36c (PIN[8]) |
| 19 | PRSNT2# signal for slot 36d (PIN[9]) |
| 20 | PRSNT2# signal for slot 36e (PIN[10]) |
| 21 | PRSNT2# signal for slot 36f (PIN[11]) |
| 22 | Reserved for PRSNT#2 signal for additional hot plug slot 36 |
| 23 | Reserved for PRSNT#2 signal for additional hot plug slot 36 |
| 24 | PRSNT1# signal for slot 36a (PIN[12]) |
| 25 | PRSNT1# signal for slot 36b (PIN[13]) |
| 26 | PRSNT1# signal for slot 36c (PIN[14]) |
| 27 | PRSNT1# signal for slot 36d (PIN[15]) |
| 28 | PRSNT1# signal for slot 36e (PIN[16]) |
| 29 | PRSNT1# signal for slot 36f (PIN[17]) |
| 30 | Reserved for PRSNT1# status for additional hot plug slot 36 |
| 31 | Reserved for PRSNT1# status for additional hot plug slot 36 |
| 32–127 | Status signals that do not cause interrupt requests when their status changes |

Figure 10:
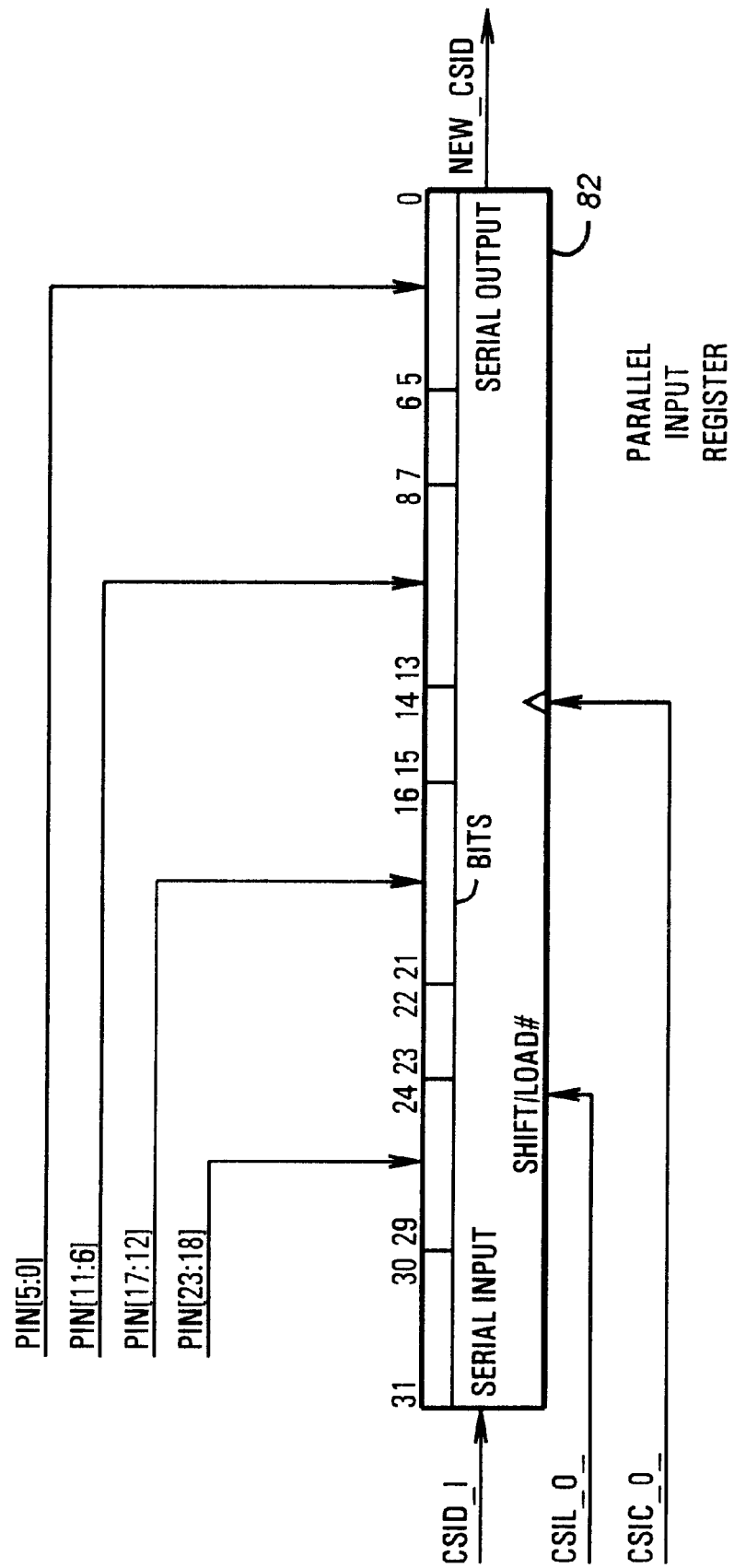
FIG. 10 is a schematic diagram of the parallel input register of FIG. 4.
Figure 13:
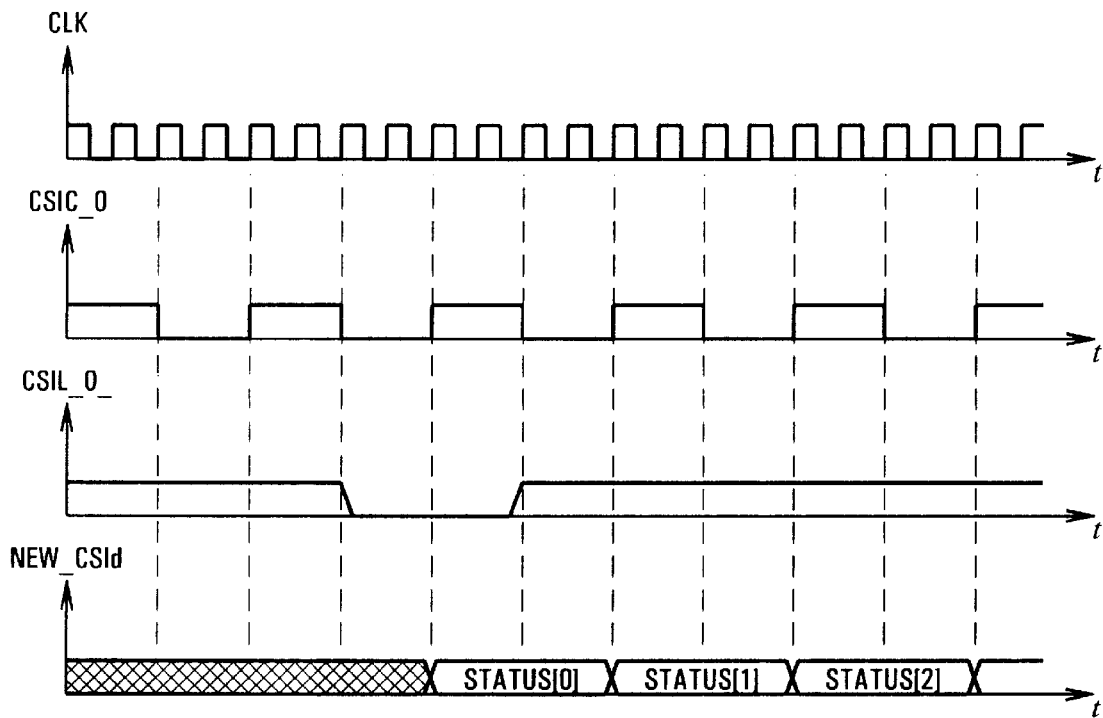
FIG. 13 shows waveforms of signals of the hot plug controller.

Referring to FIGS. 4, 10 and 13, when the controller 50 asserts, or drives low, a register load signal CSIL_O_, the shift register 52 synchronously latches the status signals STATUS[127:32] and the shift register 82 latches the status signals STATUS[31:0]. When the controller 50 negates, or drives high, the signal CSIL_O_, both the registers 52 and 82 serially shift their data to the controller 50 on the positive edge of a clock signal CSIC_O furnished by the controller 50. When active (as described below), the clock signal CSIC_O is synchronized to and one fourth the frequency of the PCI clock signal CLK.

Figure 9:
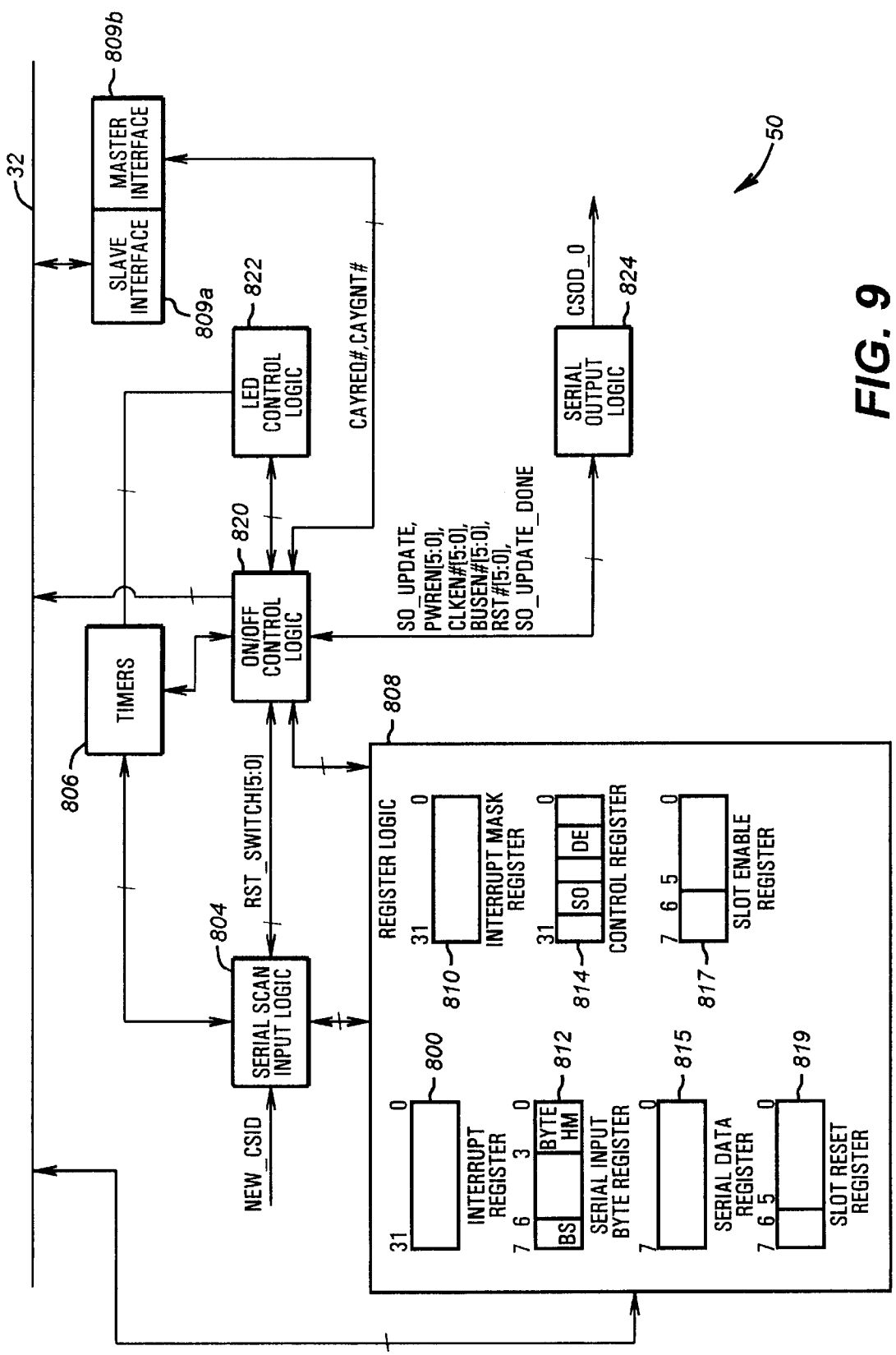
FIG. 9 is a block diagram of the hot plug controller of FIG. 1.

Referring to FIG. 9, for purposes of monitoring, or scanning, the status signals STATUS[31:0], the controller 50 uses a thirty-two bit interrupt register 800 whose bit positions correspond to the signals STATUS[31:0]. The controller 50 updates the bits of the interrupt register 800 to equal the corresponding status signals STATUS[31:0] that have been debounced, as further described below. Two status signals STATUS[7:6] are reserved for additional hot plug slots 36, and the seventh and eighth most significant bits of the interrupt register 800 are also reserved for the additional slots 36. The interrupt register 800 is part of a register logic block 808 of the controller 50 which is coupled to the PCI bus 32.

Serial scan input logic 804 of the controller 50 sequentially scans, or monitors, the status signals STATUS[31:0], least significant signal first, for changes, as indicated by transitions in their logical voltage levels. If the status of one or more of the status signals STATUS[5:0] associated with the levers 802 changes, the serial scan input logic 804 enters a slow scan mode such that the status signals STATUS[5:0] are scanned thirty-two times within a predetermined debounce time interval. If one or more of the status signals STATUS[5:0] changes, the serial scan input logic 804 updates the interrupt register 800 (and asserts the serial interrupt signal SI_INTR#) if the changed status signal STATUS[5:0] remains at the same logical voltage level for at least a predetermined debounce time interval. The serial scan input logic 804 is coupled to programmable timers 806 which generate and indicate the end of the debounce delay interval initiated by the serial scan logic 804. Requiring the status to remain stable for the debounce time interval minimizes the inadvertent powering down of one of the hot plug slots 36 due to a false value (i.e., a "glitch") indicated by one of the status signals STATUS[5:0]. When all of the status signals STATUS[5:0] remain at the same logical voltage level for at least the debounce time interval, the serial scan input logic 804 then proceeds to once again scan all thirty-two status signals STATUS[31:0] in the faster scan mode.

If the serial scan input logic 804 detects a change in one of the status signals STATUS[31:6], the serial scan input logic 804 instructs the timers 806 to measure another debounce delay interval, subsequently asserts the serial interrupt signal SI_INTR#, updates the interrupt register 800 with the signals STATUS[31:6] that have changed, and ignores further changes in the status signals STATUS[31:6] until the debounce time interval expires. After expiration of the debounce time interval, the serial scan input logic 804 proceeds to recognize changes in the thirty-two status signals STATUS[31:0].

When the serial interrupt signal SI_INTR# is asserted, the CPU 14 subsequently reads the interrupt register 800, determines which (may be more than one) status signals STATUS[31:0] caused the interrupt, and deasserts the serial interrupt signal SI_INTR# by writing a "1" to the bit or bits of the interrupt register 800 that have changed.

The CPU 14 may selectively mask interrupt requests caused by the status signals STATUS[31:0] by writing a "1" to a corresponding bit of a thirty-two bit interrupt mask register 810. The CPU 14 can also selectively read any byte of the status signals STATUS[47:0] by writing a byte number of the selected byte to a serial input byte register 812. The controller 50 then transfers the desired byte into a serial data register 815.

For example, to read the third byte (byte number two) of the status signals STATUS[23:16], the CPU 14 writes a "2" to the serial input byte register 812. The serial scan input logic 804 then serially shifts byte two of the status signals STATUS[23:16] into the serial data register 815. A busy status bit BS of the serial input byte register 812 is equal to "1" when the CPU 14 initially writes the desired byte number to the serial input byte register 812. The bit BS is cleared by the controller 50 after the requested byte has been shifted into the serial data register 815.

The CPU 14 can power up one of the slots 36 by writing a "1" to a corresponding bit of a slot enable register 817 and disable the slot 36 by writing a "0" to this bit. Furthermore, the CPU 14 can reset one of the slots 36 by writing a "1" to a corresponding bit of a slot reset register 819. The contents of the slot enable 817 and slot reset 819 registers are represented by signals SLOT_EN[5:0] and SLOT_RST_[5:0], respectively.

To initiate the request indicated by the slot enable 817 and reset 819 registers, the CPU 14 writes a "1" to an SO bit of control register 814. After the SO bit is asserted (which asserts, or drives high, a GO_UPDATE signal), the controller 50 initiates and controls the required power down and/or power up sequences. The control register 814 also has a bit DE for controlling when the dummy bus cycles 200 are enabled (DE="1") or disabled (DE="0").

The serial scan input logic 804 is coupled to ON/OFF control logic 820 which controls the power up and power down sequences. The ON/OFF control logic 820 furnishes the signals BUSEN#[5:0], CLKEN#[5:0], RST#[5:0] and PWREN[5:0] to serial output logic 824.

Each power up or power down sequence involves four shift phases during which another step of the power down or power up sequence is performed. During each shift phase, the ON/OFF control logic 820 instructs the serial output logic 824 to combine the control signals BUSEN#[5:0], CLKEN#[5:0], RST#[5:0] and PWREN[5:0]; latch these signals; and serially furnish these signals (via a serial data signal CSOD_O) to the serial input of an output shift register 80. At end of each shift phase, the ON/OFF control logic 820 instructs the shift register 80 to update the control signals POUT[35:12].

The ON/OFF control logic 820 is also interfaced to the register logic 808 and Light Emitting Diode (LED) control logic 822. The LED control logic 122 controls the on/off status of the six LEDs 54, which visually indicate whether the corresponding levers 802 are latched or unlatched. The LEDs 54 can be programmed to blink when turned on through LED control registers (not shown) of the register logic 808.

The controller 50 also has a bus interface 809 (coupled to the on/off control logic 820) for communicating with the PCI bus 32. The interface 809 has a master interface 809b that is configured to work in conjunction with a slave interface 809a to furnish the dummy bus cycles 200 to the bus 32. The master interface 809a controls the initiator signals (e.g., the address commands, the FRAME signal, REQ# signal and IRDY# signal) of the dummy bus cycle 200, and the slave interface controls the target signals (e.g., the DEVSEL# signal and the TRDY# signal) of the dummy bus cycle 200. The appearance of the dummy bus cycle 200 is governed by the states of the on/off control logic 820, described below.

Figure 11A:
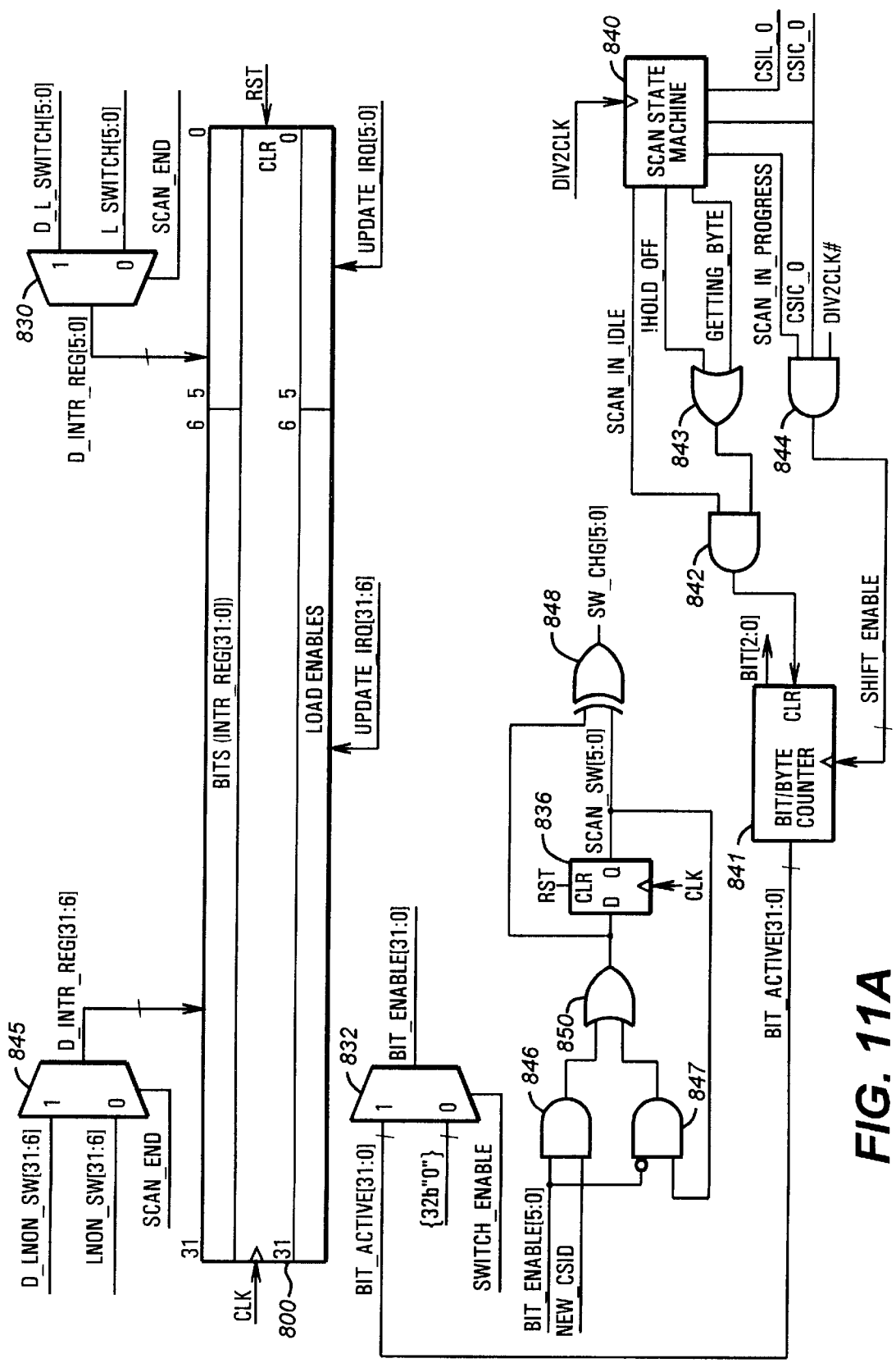
FIGS. 11A, 11B, 11C, 11D and 11E are schematic diagrams of scan logic of the hot plug controller.

As shown in FIG. 11A, the serial scan input logic 804 includes a scan state machine 840 which controls the scanning of the status signals STATUS[31:0] for changes and controls the shifting of a selected byte of the status signals STATUS[47:0] into the serial input byte register 815.

The scan state machine 840 is clocked on the negative edge of a clock signal DIV2CLK, which is synchronized to a PCI clock signal CLK and one half of the frequency of the PCI clock signal CLK. The load and clock signals, CSIL_O_ and CSIC_, respectively, are furnished by the scan state machine 840. The clock signal, when enabled, is synchronized to the clock signal CSIC_O.

A bit/byte counter 841, through a thirty-two bit signal BIT_ACTIVE[31:0], indicates which bit of the status signals STATUS[31:0] is currently represented by the serial data signal NEW_CSID. The asserted bit of the signal BIT_ACTIVE[31:0] has the same bit position as the status signal STATUS[31:0] represented by the data signal NEW_CSID.

The counter 841 also furnishes a three bit signal BIT[2:0] which represents which bit of the current byte of the status signals STATUS[31:0] is currently being scanned by the scan state machine 840. The counter 841 is clocked on the negative edge of a signal SHIFT_ENABLE. The outputs of the counter 841 are reset, or cleared, when the output of an AND gate 842, connected to the clear input of the counter 841, is negated.

The scan state machine 840 furnishes a signal SCAN_IN_IDLE which when asserted, or high, indicates that the scan state machine 840 is in an IDLE state and not currently scanning any of the status signals STATUS[127:0]. The signal SCAN_IN_IDLE is deasserted otherwise.

The signal SCAN_IN_IDLE is furnished to one input of the AND gate 842. The other input of the AND gate 842 is connected to the output of an OR gate 843. One input of the OR gate 843 receives an inverted HOLD_OFF signal, and the other input of the OR gate 843 receives a signal GETTING_BYTE.

The signal HOLD_OFF, when asserted, or driven high, indicates that a change in one of the status signals STATUS[5:0] has been detected, and the serial scan logic 804 has entered the slow scan mode. In the slow scan mode, the serial scan input logic 804 waits for a predetermined slow scan interval before traversing the status signals STATUS[31:0] again. The serial scan input logic 804 counts the number of times the serial scan signals STATUS[5:0] are scanned during the slow scan mode and uses this count to determine when one of the status signal STATUS[5:0] has remain unchanged for the debounce delay interval, as further described below.

Therefore, when the scan state machine 840 is in the IDLE state and the either the HOLD_OFF signal is deasserted or the scan state machine 840 is reading in a selected byte (selected by the CPU 14) of the status signals STATUS[147:0], all outputs of the counter 841 are cleared, or set equal to zero.

In another embodiment, the HOLD_OFF signal does not cause the serial scan logic to enter the slow scan mode. Instead, the state machine 840 runs continually and is only briefly in the idle state. When HOLD_OFF signal is asserted, or driven high, it indicates that a change has occurred on one or more of the STATUS[5:0] signals and that the STATUS[5:0] signals are being debounced. The duration of the HOLD_OFF signal is controlled by time 806.

In this other embodiment, the HOLD_OFF signal prevents the (filter) counters 831 from advancing, even though the STATUS[5:0] signals have not changed in the previous scan. However, any scan in which the STATUS[5:0] signals have changed will cause the filter counters 831 to be cleared or set equal to zero, regardless of the state of the HOLD_OFF signal. When the timer 806 completes measuring the HOLD_OFF delay interval, it causes the HOLD_OFF signal to deassert via assertion of signal FILTER_TIMEOUT using JK flip-flop 885. For as long as any one of the STATUS[5:0] signals have not reached its maximum count (as indicated by the MAX[5:0] signals), the HOLD_OFF signal will be deasserted for one scan period, following the assertion of the FILTER_TIMEOUT signal. The product of the HOLD_OFF assertion time interval and the maximum number of counts for counters 831 is equal to the debounce time interval (8 ms).

The signal SHIFT_ENABLE is furnished by the output of an AND gate 844. One input of the AND gate 844 receives the clock signal CSIC_O. Another input of the AND gate 844 receives a signal DIV2CLK#. The signal DIV2CLK# is asserted, or driven low, on the negative edge of the signal CLKDIV4. The third input of the AND gate 844 receives a signal SCAN_IN_PROGRESS, which when asserted, or driven high, indicates that the scan state machine 840 is currently scanning the status signals STATUS[127:0], and the signal SCAN_IN_PROGRESS is deasserted otherwise.

Therefore, when the scan state machine 840 is not shifting in the status signals STATUS[127:0], the counter 841 is disabled. Furthermore, when enabled, the counter 841 is clocked on the negative edge of the clock signal DIV2CLK.

The interrupt register 800 receives input signals D_INTR_REG[31:0] at its corresponding thirty-two inputs. The load enable inputs of the interrupt register 800 receive corresponding load enable signals UPDATE_IRQ[31:0]. The interrupt register 800 is clocked on the positive edge of the PCI clock signal CLK.

For purposes of keeping track of the status signals STATUS[5:0] after each scan, a multi-bit, D-type flip-flop 836 furnishes status signals SCAN_SW[5:0]. The clear input of the flip-flop 836 receives the reset signal RST, and the flip-flop 836 is clocked on the positive edge of the clock signal CLK. The input of the flip-flop 836 is connected to the output of a multi-bit OR gate 850 which has one input connected to the output of a multi-bit AND gate 846 and one input connected to the output of a multi-bit AND gate 847. One input of the AND gate 846 receives six bit enable signals BIT_ENABLE[5:0] (described below) and the other input of the AND gate 846 receives the serial data signal NEW_CSID. One input of the AND gate 847 receives inverted bit enable signals BIT_ENABLE[5:0], and the other input of the AND gate 847 receives the signals SCAN_SW[5:0].

Only one of the bit enable signals BIT_ENABLE[5:0] is asserted at one time (when the scan state machine 840 is scanning), and the asserted bit indicates which one of the corresponding status signals STATUS[31:0] is represented by the signal NEW_CSID. Thus, when the scan state machine 840 is scanning, on every positive edge of the clock signal CLK, the signals SCAN_SW[5:0] are updated.

The bit enable signals BIT_ENABLE[31:0] are furnished by the output of a multi-bit multiplexer 832 that receives the bits BIT_ACTIVE[31:0] at its one input. The zero input of the multiplexer 832 receives a thirty-two bit signal indicative of logic zero. The select input of the multiplexer 832 receives the signal SHIFT_ENABLE.

For purposes of detecting a change in the status signals STATUS[5:0], a multi-bit, Exclusive Or (XOR) gate 848 furnishes switch change signals SW_CHG[5:0]. When one of the signals SW_CHG[5:0] is asserted, or high, the logical voltage of the corresponding status signal STATUS[5:0] changed during successive scans. One input of the XOR gate 848 is connected to the input of the flip-flop 836, and the other input of the XOR gate 848 receives the signals SCAN_SW[5:0].

Figure 11B:
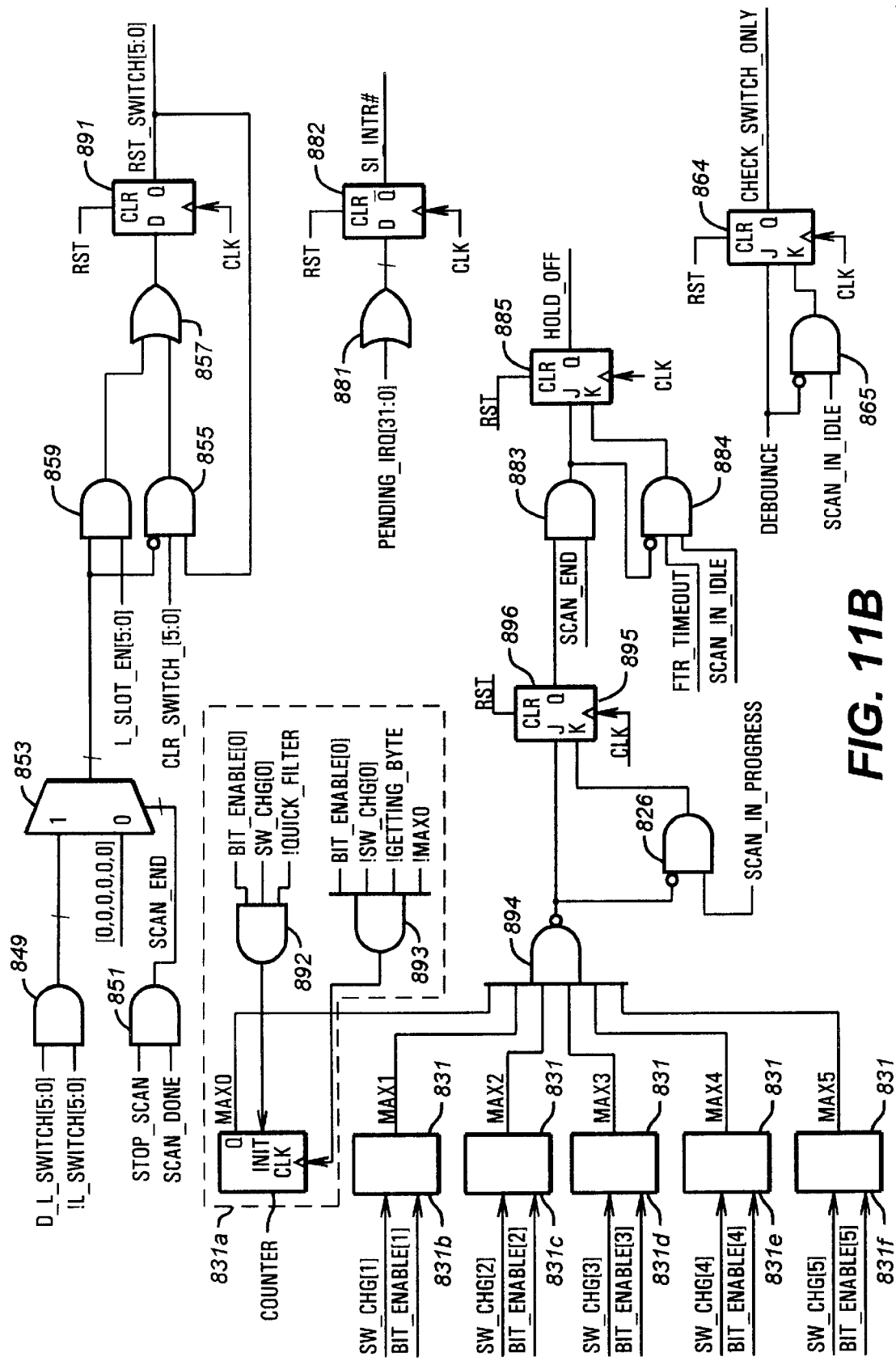
Figure 11C:
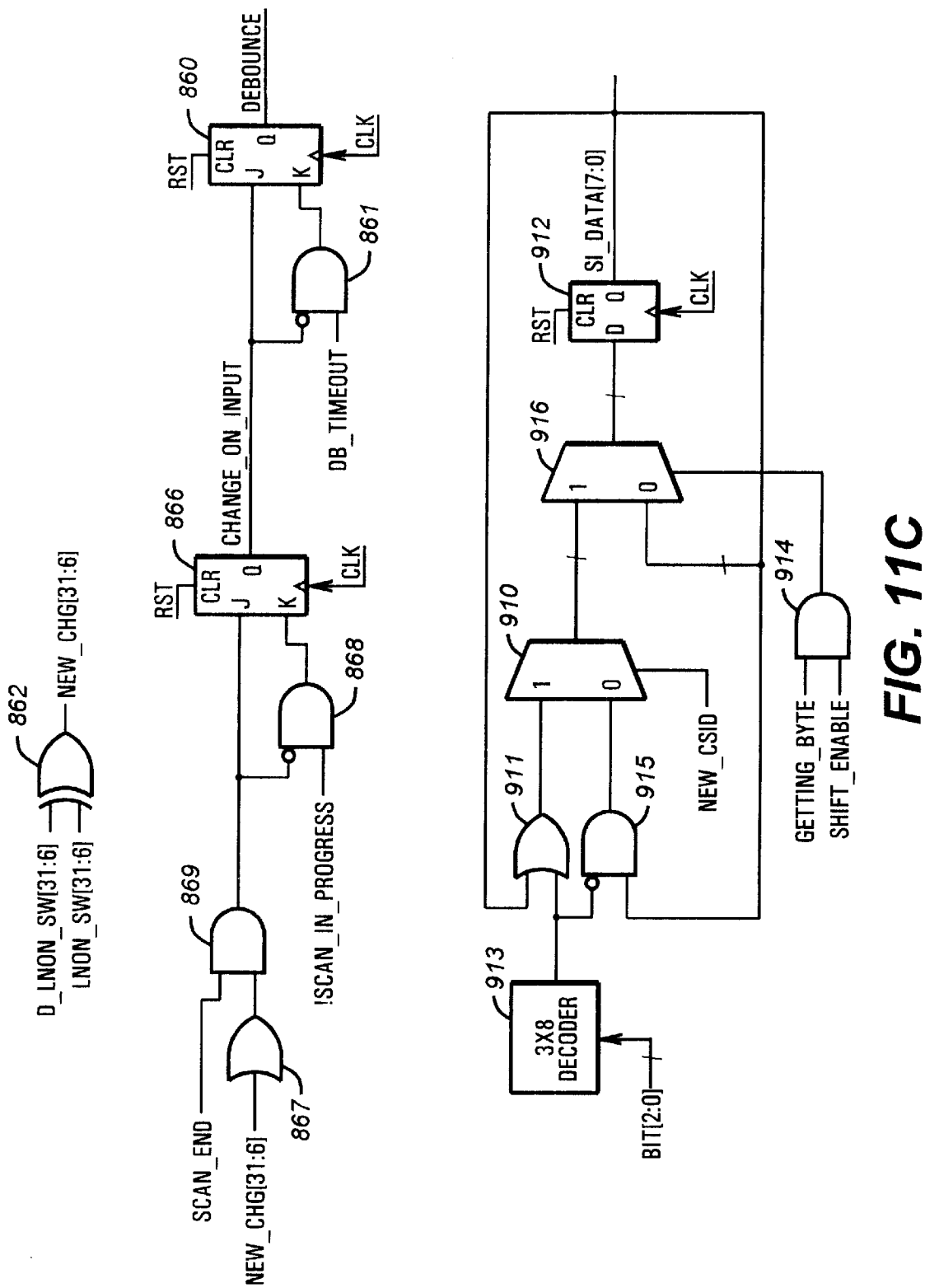
Figure 11D:
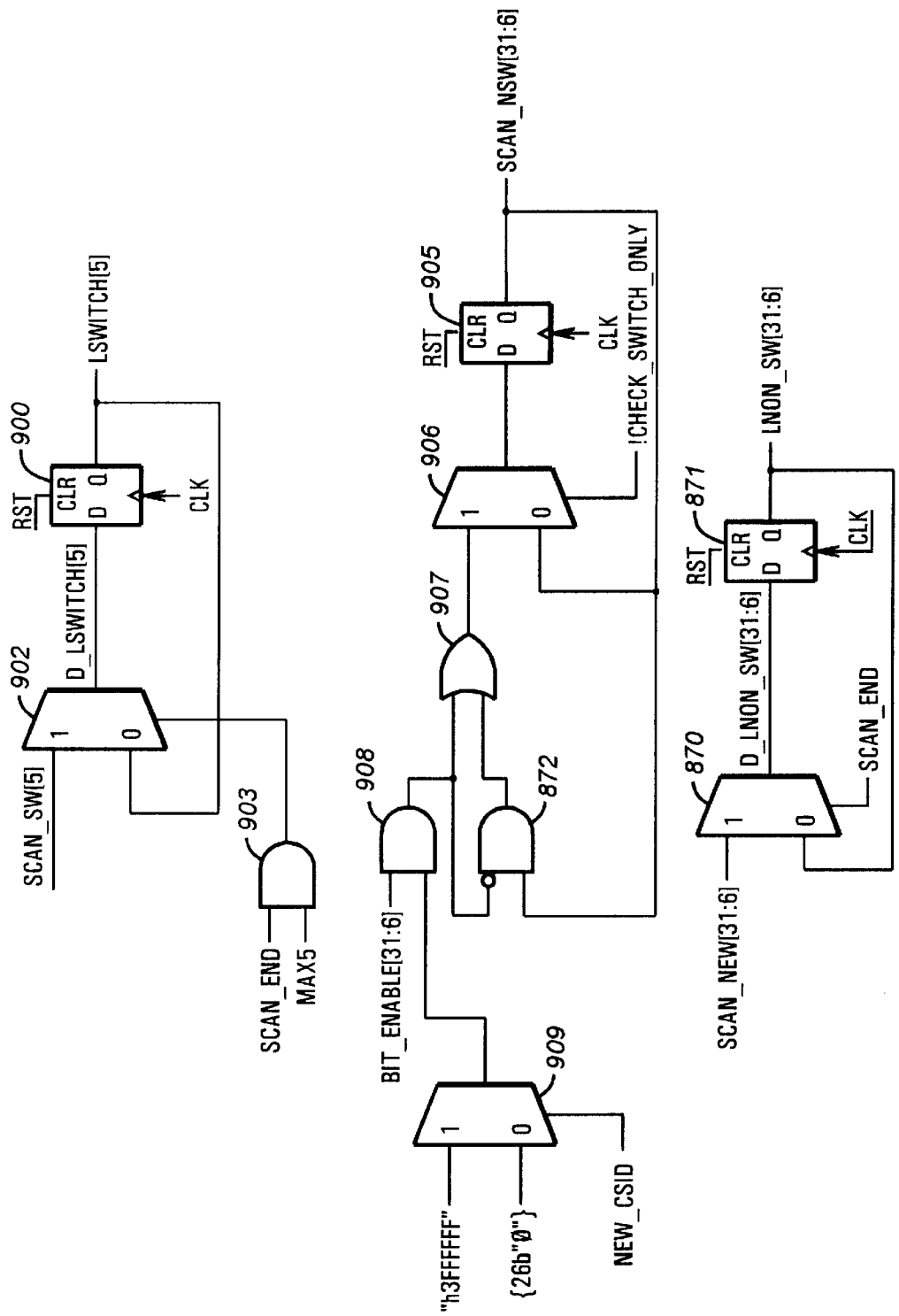

As shown in FIG. 11D, for purposes of indicating when the logical voltage level of a selected status signal STATUS[5:0] has remained at the logical voltage level for at least the duration of the debounce delay interval, the scan input logic 804 has six signals LSWITCH[5:0]. The non-inverting input of a D-type flip-flop 900 furnishes the signal LSWITCH[5] at its non-inverting output. The signal LSWITCH[5] is asserted, or driven high, to indicate the above-described condition and deasserted otherwise. The flip-flop 900 is clocked on the positive edge of the clock signal CLK, and the clear input of the flip-flop 900 receives the RST signal.

The input of the flip-flop 900 is connected to the output of a multiplexer 902 which furnishes a D_LSWITCH[5] signal. The select input of the multiplexer 902 is connected to the output of an AND gate 903 that receives a MAX5 signal and a SCAN_END signal. The SCAN_END signal, when asserted, indicates the scan state machine 840 has completed the current scan. Five signals (MAX5, MAX4, MAX3, MAX2, MAX1 AND MAX0) indicate whether the corresponding status signal STATUS[5], STATUS[4], STATUS[3], STATUS[2], STATUS[1], or STATUS[0], respectively, has remained at the same logical voltage level for a least the duration of the debounce time interval. The zero input of the multiplexer 902 receives the signal LSWITCH[5], and the one input of the multiplexer 902 receives the signal SCAN_SW[5]. The signal SCAN_END is furnished by the output of an AND gate 851 (FIG. 12B). The AND gate 851 receives a signal STOP_SCAN and a signal SCAN_DONE. The signal STOP_SCAN is asserted, or driven high, when conditions for ending the scanning by the scan state machine 840 are present, as further described below. The signal SCAN_END is a pulsed (for one cycle of the CLK signal) version of the STOP_SCAN signal. The signals LSWITCH [4]-LSWITCH[0] and D_LSWITCH[4]-D_LSWITCH[0] are generated in a similar fashion from the respective SCAN_SW[4]-SCAN_SW[0] signals and the respective signals MAX4-MAX0.

For purposes of updating the logical voltage level of the status signals STATUS[31:6] as these signals are scanned in, a multi-bit D-type flip-flop 905 (FIG. 12D) furnishes twenty-six signals SCAN_NSW[31:6]. One of the signals SCAN_NSW[31:6] is asserted, or driven high, to indicate this condition and deasserted otherwise. The flip-flop 905 is clocked on the positive edge of the clock signal CLK, and the clear input of the flip-flop 905 receives the RST signal.

The input of the flip-flop 905 is connected to the output of a multi-bit multiplexer 906. The select input of the multiplexer 906 receives an inverted CHECK_SWITCH_ONLY signal. The CHECK_SWITCH_ONLY signal is asserted, or driven high, when the scan state machine 840 is only scanning the status signals STATUS[5:0] or status signals STATUS[127:32] (i.e., ignoring changes in the signals STATUS[31:6]) and deasserted otherwise. The zero input of the multiplexer 906 receives the signals SCAN_NSW [31:6], and the one input of the multiplexer 906 is connected to the output of a multi-bit OR gate 907. One input of the OR gate 907 is connected to the output of a multi-bit AND gate 908, and the other input of the OR gate 907 is connected to the output of a multi-bit AND gate 872.

One input of the AND gate 908 receives the signals BIT_ENABLE[31:6]. The other input of the AND gate 908 is connected to the output of a multi-bit multiplexer 909. If the NEW_CSID signal is asserted, or high, the multiplexer 909 furnishes a twenty-six bit signal equal to "h3FFFFFF." Otherwise, the multiplexer furnishes a twenty-six bit signal equal to "0." One input of the AND gate 872 is connected to the inverted output of the AND gate 908, and the other input of the AND gate 872 receives the signals SCAN_NSW[31:6].

For purposes of storing the logical voltage level of the status signals STATUS[31:6] after every scan, a multi-bit, D-type flip-flop 871 furnishes twenty-six signals LNON_SW[31:6]. One of the signals LNON_SW[31:6] is asserted, or driven high, to indicate this condition and deasserted otherwise. The flip-flop 871 is clocked on the positive edge of the clock signal CLK, and the clear input of the flip-flop 871 receives the RST signal.

The input of the flip-flop 871 is connected to the output of a multi-bit multiplexer 870 which furnishes the signals D_LNON_SW[31:6]. The select input of the multiplexer 870 receives the signal SCAN_END. The zero input of the multiplexer 870 receives the signals LNON_SW[31:6], and the one input of the multiplexer 807 receives the signals SCAN_NSW[31:6].

As shown in FIG. 11B, for purposes of generating the MAX0, MAX1, MAX2, MAX3, MAX4, and MAX5 signals, the serial input logic 804 includes six counters 831a–f, respectively, of common design 831. Each counter 831 is initialized (to a predetermined count value) when an AND gate 892 asserts, or drives high, its output. For the counter 831a, the AND gate 892 receives the signal BIT_ENABLE[0], the signal SW_CHG[0] and an inverted signal QUICK_FILTER. The signal QUICK_FILTER, when asserted, or high, can be used to circumvent the debounce time interval. The QUICK_FILTER signal is normally deasserted, or low. The clock input of the counter 831 is connected to the output of an AND gate 893. For the counter 831a, the AND gate 893 receives the BIT_ENABLE[0] signal, the inverted SW_CHG[0] signal, the inverted GETTING_BYTE signal, and the inverted MAX0 signal. Therefore, for the counter 831a, once the logical voltage of the status signal STATUS[0] changes, each time the serial scan logic 804 scans the status signal STATUS[0], the counter 831a is incremented. When the counter 831a reaches its maximum value, the signal MAX0 is asserted which indicates the debounce time interval has elapsed. If the logical voltage of the status signal STATUS[0] changes during the count, the counter 831a is reinitialized and the count begins again. The other counters 831b–f function in a similar fashion for their corresponding status signals STATUS[5:1].

The HOLD_OFF signal, when asserted, instructs one of the timers 806 to measure a predetermined slow scan interval which puts the serial scan state machine 840 in the slow scan mode. When the timer 806 completes measuring this delay interval, the timer 806 asserts, or drives high, a FTR_TIMEOUT signal which is otherwise deasserted, or negated. The product of this slow scan interval and the number of counts for the counter 831 to reach its maximum value is equal to the debounce time interval (8 ms).

The HOLD_OFF signal is furnished by the output of a JK flip-flop 885. The flip-flop 885 is clocked on the positive edge of the CLK signal, and the clear input of the flip-flop 885 receives the RST signal. The J input is connected to the output of an AND gate 883, and the K input is connected to the output of an AND gate 884. One input of the AND gate 884 is connected to the output of a JK-type flip-flop 896, and the other input of the AND gate 883 receives the SCAN_END signal. One input of the AND gate 884 is connected to the inverted output of the AND gate 883, one input of the AND gate 884 receives the FTR_TIMEOUT signal, and another input of the AND gate 884 receives a SCAN_IN_IDLE signal, which is asserted when the scan state machine 840 is in its IDLE state, as further described below.

The flip-flop 895 is clocked on the positive edge of the CLK signal, and the clear input of the flip-flop 895 receives the RST signal. The J input is connected to the output of a NAND gate 894 which receives the MAX0, MAX1, MAX2, MAX3, MAX4 and MAX5 signals. The K input is connected to the output of an AND gate 826 which is connected to the inverted J input of the flip-flop 895 and receives an inverted SCAN_IN_PROGRESS signal which is asserted when the scan state machine 840 is scanning the status signals STATUS[31:0].

For purposes of generating the CHECK_SWITCH_ONLY signal, the serial scan input logic 804 includes a JK-type flip-flop 864 which furnishes the CHECK_SWITCH_ONLY signal at its non-inverting output and is clocked on the positive edge of the CLK signal. The clear input of the flip-flip 864 receives the RST signal, and the J input of the flip-flop 864 receives a DEBOUNCE signal, which when asserted, or driven high, indicates that one of the logical voltage level of one or more of the status signals STATUS[31:6] has changed. The K input of the flip-flop 864 is connected to the output of a AND gate 865. One input of the AND gate 865 receives the inverted DEBOUNCE signal, and one input of the AND gate 865 receives the SCAN_IN_IDLE signal.

As shown in FIG. 11C, the debounce signal DEBOUNCE is furnished by the non-inverting output of a JK-type flip-flop 860. The flip-flop 860 is clocked by the positive edge of the clock signal CLK, and the clear input of the flip-flop 860 receives the reset signal RST. The J input of the flip-flop 860 receives a signal CHANGE_ON_INPUT signal. The CHANGE_ON_INPUT signal is asserted, or driven high, when a change in one of the status signals STATUS[31:6] is detected at the end of a scan by the serial input logic 804 and deasserted otherwise. The K input is connected to the output of an AND gate 861 which receives a DB_TIMEOUT signal at one of its inputs. The other input of the AND gate 861 receives the inverted CHANGE_ON_INPUT signal. The DB_TIMEOUT signal is asserted by the timers 106 for one cycle of the CLK signal when the debounce time delay (initiated by the assertion of the DEBOUNCE signal) has expired. The assertion of the DB_TIMEOUT signal negates the DEBOUNCE signal on the next positive edge of the CLK signal.

The CHANGE_ON_INPUT signal is furnished by the non-inverting output of a JK-type flip-flop 866 which is clocked on the positive edge of the CLK signal. The clear input of the flip-flop receives the RST signal. The J input of the flip-flop 866 is connected to the output of an AND gate 869 which receives the SCAN_END signal, and another input of the AND gate 869 is connected to the output of an OR gate 867. The OR gate 867 logically Ors all of a set of NSW_CHG[31:6] signals. The bit positions of the signals NSW_CHG[31:6] correspond to the bit positions of the status signals STATUS[31:6] and indicate, by their assertion, whether the corresponding status signal STATUS[31:6] has changed after the last scan. The AND gate 869 further receives the SCAN_END signal. The K input of the flip-flop 866 is connected to the output of an AND gate 868 which receives the inverted SCAN_IN_PROGRESS signal and the inverted output of the AND gate 869. The signals NSW_CHG[31:6] are furnished by the output of a multi-bit, XOR gate 862 which receives the signals D_LNON_SW[31:6] and LNON_SW[31:6].

The non-inverting output of a multi-bit D-type flip-flop 912 furnishes bits SI_DATA[7:0] for the serial data register 815. The clear input of the flip-flop 912 receives the signal RST, and the flip-flop 912 is clocked on the positive edge of the CLK signal. The signal input of the flip-flop 912 is connected to the output of a multi-bit multiplexer 916. The select input of the multiplexer 916 is connected to the output of an AND gate 914, and the zero input of the multiplexer 916 receives the bits SI_DATA[7:0]. The AND gate 914 receives the signals GETTING_BYTE and SHIFT_ENABLE. Thus, when the serial scan logic 804 is not shifting in a requested byte of the status signals STATUS[47:0], the values of the bits SI_DATA[7:0] are preserved.

The one input of the multiplexer 916 is connected to the output of a multi-bit multiplexer 910. The one input of the multiplexer 910 is connected to the output of a multi-bit OR gate 911, and the zero input of the multiplexer is connected to the output of a multi-bit AND gate 915. The select input of the multiplexer 910 receives the signal NEW_CSID.

One input of the AND gate 915 receives the bits SI_DATA[7:0], and an inverting input of the AND gate 915 is connected to the output of a 3×8 decoder 913. The decoder 913 receives the signal BIT[2:0]. One input of the OR gate 911 receives the bits SI_DATA[7:0], and the other input of the OR gate 911 receives the output of the decoder 913.

The serial input logic 804 furnishes five signals RST_SWITCH[5:0] (corresponding to the bit positions of the status signals STATUS[5:0]) to the ON/OFF control logic 820 which indicate, by their assertion, whether the corresponding slot 36a–f should be powered down. The ON/OFF control logic 820 indicates when the slot 36 (indicated by the RST_SWITCH[5:0] signals) has subsequently been powered down by the subsequent assertion of one of five signals CLR_SWITCH_[5:0] signals whose bit positions correspond to the signals RST_SWITCH[5:0]. After receiving the indication that the slot 36 has been powered down, the serial logic 804 then deasserts the corresponding RST_SWITCH[5:0] signal.

The signals RST_SWITCH[5:0] are furnished by the non-inverting output of a multi-bit, D-type flip-flop 891 (FIG. 12B). The clear input of the flip-flop 891 receives the reset signal RST, and the flip-flop 891 is clocked on the positive edge of the clock signal CLK. The input of the flip-flop 891 is connected to the output of a multi-bit OR gate 857 which has one input connected to the output of a multi-bit AND gate 859 and one input connected to the output of a multi-bit AND gate 855. One input of the AND gate 859 is connected to the output of a multiplexer 853, and the other input of the AND gate 859 receives latched slot enable signals LSLOT_EN[5:0] which indicate, by their assertion, whether the corresponding slot 36a–f is powered up. One input of the AND gate 855 receives the signals CLR_SWITCH_[5:0] signals. Another input of the AND gate 855 receives the signals RST_SWITCH[5:0]. Another input of the AND gate 855 is connected to the inverted output of the multiplexer 853.

The zero input of the multiplexer 853 receives a six bit signal indicative of zero. The one input of the multiplexer 853 is connected to the output of a multi-bit AND gate 849. One input of the AND gate 849 receives the signals D_LSWITCH[5:0], and the other input of the AND gate 849 receives the inverted signals L_SWITCH[5:0]. The select input of the multiplexer 853 receives the SCAN_END signal.

For purposes of generating the SI_INTR# signal, the serial scan logic 804 includes a D-type flip-flop 882 which furnishes the serial interrupt signal SI_INTR# at its inverting output. The flip-flop 882 is clocked on the positive edge of the CLK signal, and the clear input of the flip-flip 882 receives the RST signal. The input of the flip-flop 882 is connected to the output of an OR gate 881 which receives thirty two pending interrupt signals PENDING_IRQ[31:0], which indicate, by their assertion, or driving high, whether an interrupt is pending for the corresponding one of the status signals STATUS[31:0]. The signals PENDING_IRQ[31:0] are otherwise deasserted.

Figure 11E:
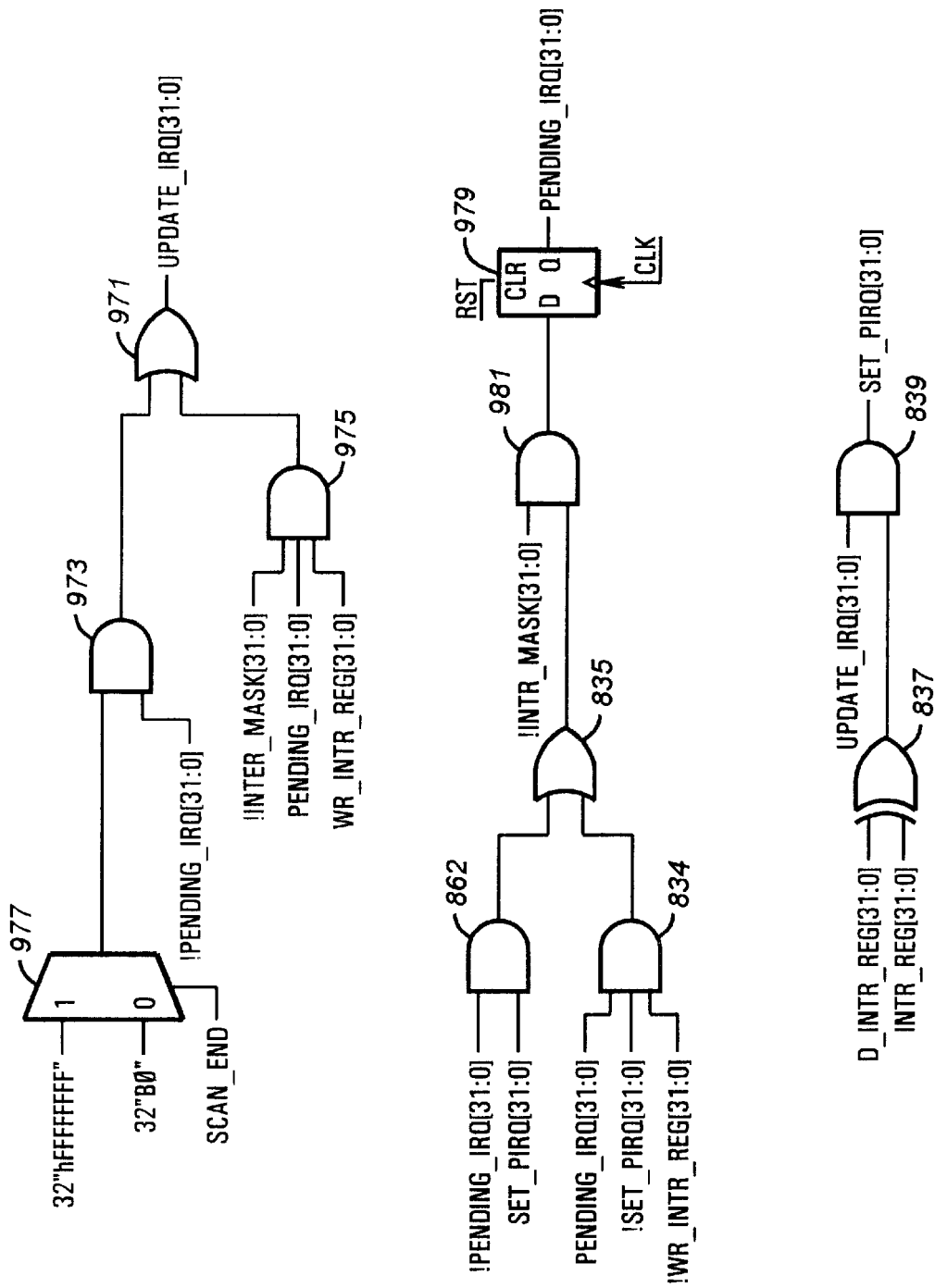

As shown in FIG. 11E, a multi-bit, D-type flip-flop 979 furnishes the signals PENDING_IRQ[31:0] at its non-inverting output. The flip-flop 979 is clocked on the positive edge of the signal CLK signal and receives the signal RST at its clear input. The input of the flip-flop 979 is connected to the output of a multi-bit AND gate 981 which receives inverted interrupt mask signals INTR_MASK[31:0] at one input. The signals INTR_MASK[31:0] are indicative of corresponding bit of the interrupt mask register 810. The other input of the AND gate 981 is connected to the output of a multi-bit OR gate 835. One input of the OR gate 835 is connected to the output of a multi-bit AND gate 862, and the other input of the OR gate 835 is connected to the output of a multi-bit AND gate 834.

The AND gate 862 receives inverted PENDING_IRQ[31:0] signals and signals SET_PIRQ[31:0]. The signals SET_PIRQ[31:0] are asserted to indicate an interrupt request should be generated for the corresponding one of the status signals STATUS[31:0]. Therefore, the signals PENDING_IRQ[31:0] are updated with the signals SET_PIRQ[31:0] if not masked by the signals INTR_MASK[31:0].

The AND gate 834 receives the signals PENDING_IRQ [31:0], inverted signals SET_PIRQ[31:0] and inverted WR_INTR_REG[31:0] signals. The signals WR_INTR_REG[31:0] indicate the write data furnished by the CPU 14 to the interrupt register 800. The CPU clears an interrupt by writing a "1" to the corresponding bit of the interrupt register 800. Therefore, if this occurs, and no new interrupt requests are indicated for the corresponding one of the status signals STATUS[31:0], the corresponding one of the signals PENDING_IRQ[31:0] is cleared.

The signals SET_PIRQ[31:0] are furnished by the output of a multi-bit AND gate 839. One input of the AND gate 839 receives the signals UPDATE_IRQ[31:0]. The other input of the AND gate 839 is connected to the output of a multi-bit XOR gate 837. One input of the XOR gate 837 receives the signals D_INTR_REG[31:0], the other input of the XOR gate 837 receives the signals INTR_REG[31:0]. Therefore, when the bits of the interrupt register 800 transition from one logical state to another, an interrupt request is generated.

For purposes of updating the bits of the interrupt register 800, the signals UPDATE_IRQ[31:0] are furnished to the corresponding load inputs of the register 800. When one of the signals UPDATE_IRQ[31:0] is asserted, or driven high, the corresponding bit is loaded with the corresponding one of the signals D_INTR_REG[31:0].

The signals UPDATE_IRQ[31:0] are furnished by the output of a multi-bit OR gate 971. One input of the OR gate 971 is connected to the output of a multi-bit AND gate 973. One input of the AND gate 973 is connected to the output of a multi-bit multiplexer 977, and the other input of the AND gate 973 receives inverted PENDING_IRQ[31:0] signals. The select input of the multiplexer 977 receives the signal SCAN_END, the one input of the multiplexer 977 receives a thirty-two bit signal indicative of "FFFFFFFFh," and the zero input of the multiplexer 977 receives a thirty-two bit signal indicative of "0." Therefore, at the end of a scan, the signals UPDATE_IRQ[31:0] allow the bits of the interrupt register 800 to be updated that correspond to the asserted PENDING_IRQ[31:0] signals.

Another input of the OR gate 971 is connected to the output of a multi-bit AND gate 975. One input of the AND gate 975 receives the inverted INTR_MASK[31:0] signals, another input of the AND gate 975 receives the signals PENDING_IRQ[31:0], and another input of the AND gate 975 receives the signals WR_INTR_REG[31:0]. Therefore, the CPU 14 can selectively clear bits of the signals PENDING_IRQ[31:0].

The signals D_INTR_REG[5:0] are furnished by the output of a multi-bit multiplexer 830. When the SCAN_END signal is asserted, the signals D_INTR_REG[5:0] are equal to the signals D_LSWITCH[5:0]. When the SCAN_END signal is deasserted, the signals D_INTR_REG[5:0] are equal to the signals LSWITCH[5:0].

The signals D_INTR_REG[31:6] are furnished by the output of a multi-bit multiplexer 845. When the SCAN_END signal is asserted, the signals D_INTR_REG[31:6] are equal to the signals D_LNON_SW[31:6]. When the SCAN_END signal is deasserted, the signals D_INTR_REG[5:0] are equal to the signals LNON_SW[31:6]. The interrupt register 800 takes on new values only when the signal SCAN_END is asserted.

Figure 12:
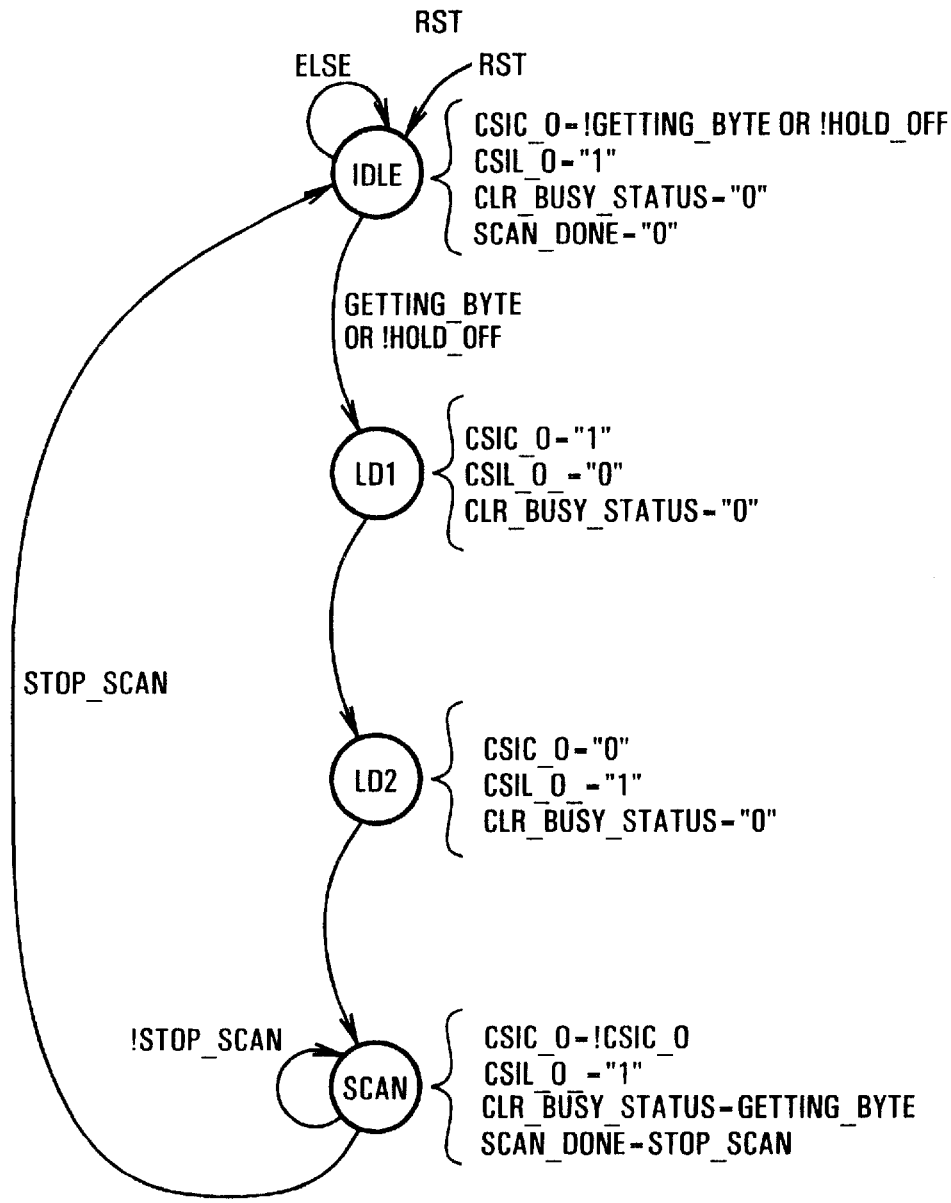
FIG. 12 is a state diagram illustrating operation of the scan state machine of FIG. 11A.

Referring to FIGS. 12 and 13, the scan state machine 840 enters an IDLE state after the assertion of the reset signal RST. When not in the IDLE state, the scan state machine 840 toggles the states of the serial input clock signal CSIC_O in order to clock the shift register 82. Furthermore, when not in a first load state LD1, the scan state machine 840 asserts, or drives high, the load signal CSIL_O_ in order to enable the registers 82 and 52 to serially shift the status signals STATUS[127:0] to the controller 50. In the IDLE state, the scan state machine 840 sets the signal SCAN_DONE equal to zero.

The scan state machine 840 transitions from the IDLE state to the state LD1 when either the signal GETTING_BYTE is asserted or the signal HOLD_OFF is deasserted. Otherwise, the scan state machine 840 remains in the IDLE state. In the LD1 state, the scan state machine 840 asserts, or drives low, the load signal CSIL_O_ which enables the registers 82 and 52 to latch and start receiving the status signals STATUS[127:0].

The scan state machine 840 transitions from the LD1 state, to a load two state LD2. In the LD2 state, the load signal CSIL_O_ is kept asserted which enables the registers 82 and 52 to serially shift the status signals STATUS[127:0].

The scan state machine 840 subsequently transitions to a scan state SCAN. In the SCAN state, the serial scan input logic 804 scans in one of the status signals STATUS[127:0] on each negative edge of the clock signal DIV2CLK. When the signal STOP_SCAN is asserted, the scan state machine 840 transitions back to the IDLE state. The STOP_SCAN signal is asserted when either the desired byte of the status signals STATUS[127:0] has been shifted into the serial data register 815; the lever status signals STATUS[5:0] have been scanned in and the serial interrupt signal SI_INTR# has been asserted; or all of the status signals STATUS[31:0] have been shifted in. In the SCAN state, the SCAN_DONE signal is set equal to the STOP_SCAN signal.

Figure 14:
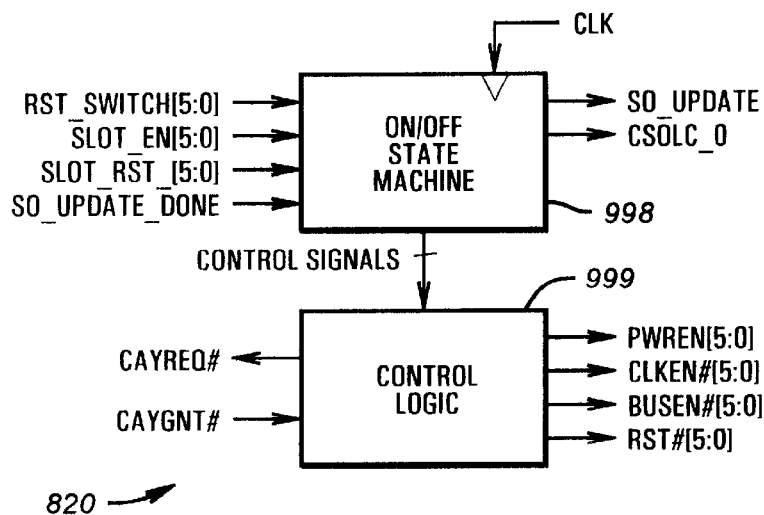
FIG. 14 is a schematic diagram of the on/off logic of the hot plug controller.
Figure 15:
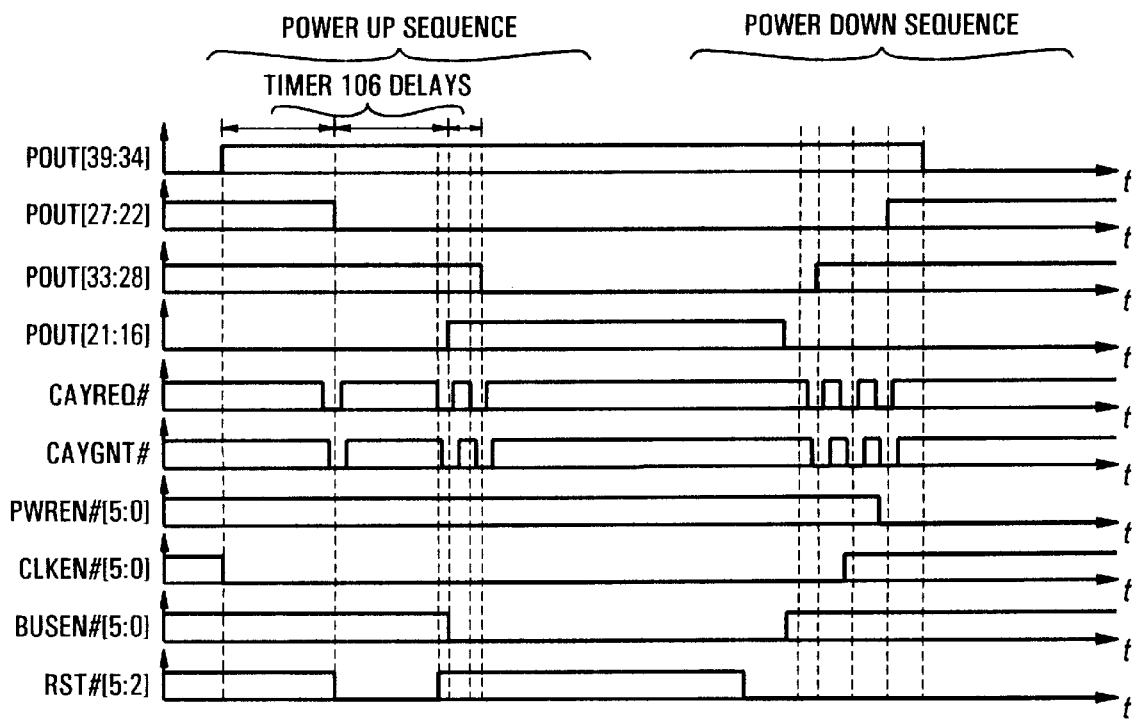
FIG. 15 shows waveforms of signals of the hot plug controller.
Figure 16A:
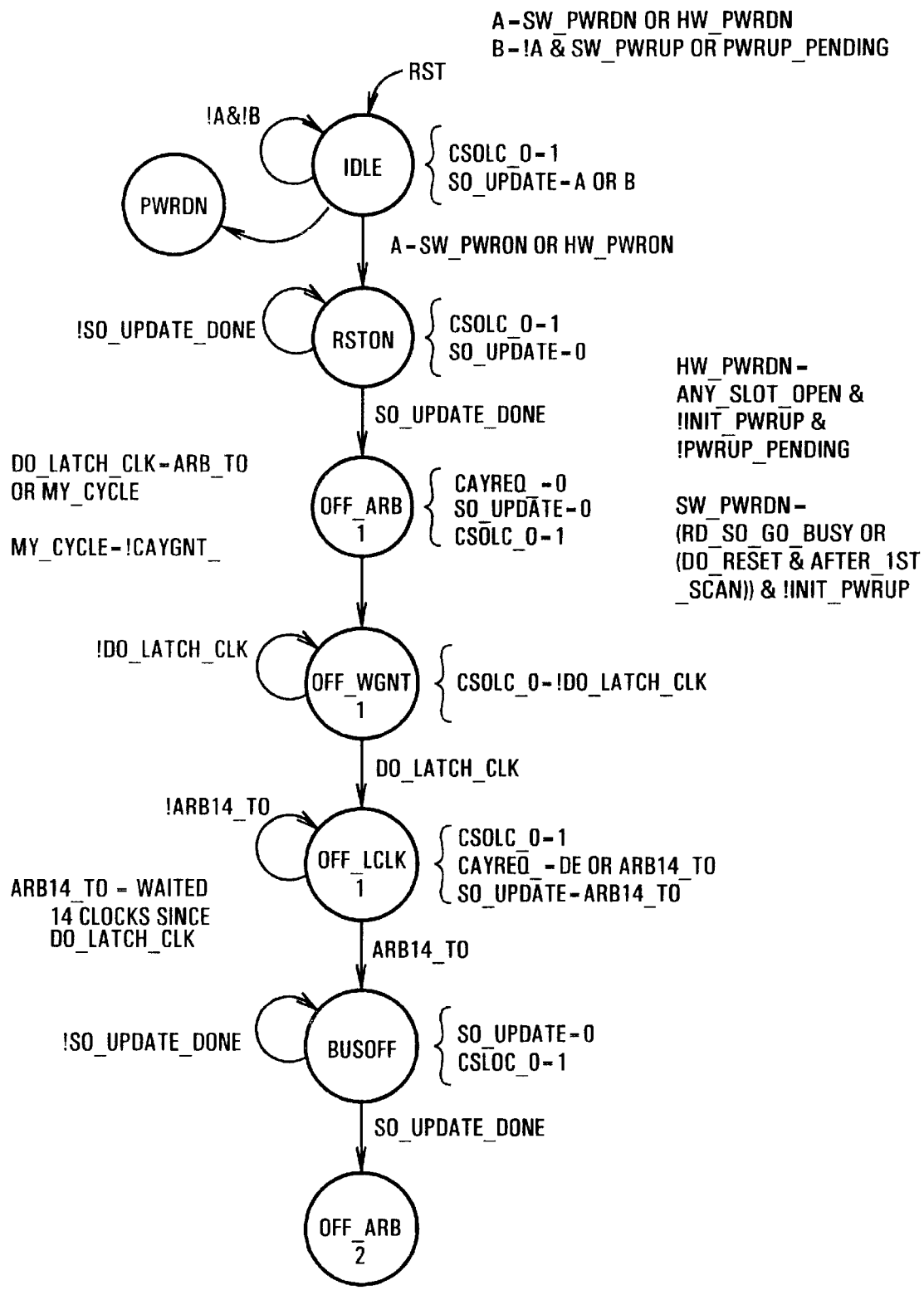
FIGS. 16A, 16B, 16C, 16D, 16E and 16F are a state diagram illustrating logic of the hot plug controller.
Figure 16B:
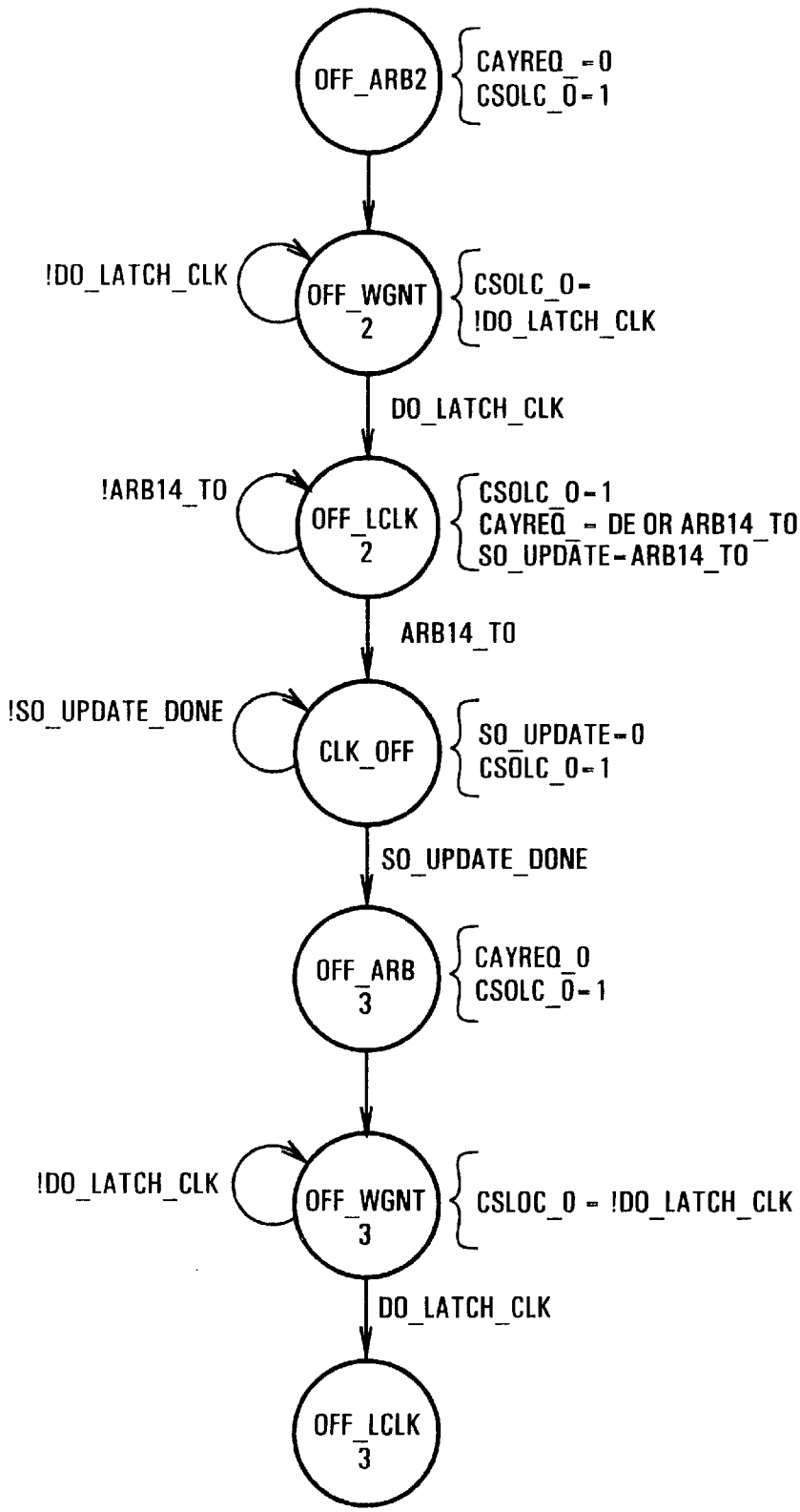
Figure 16C:
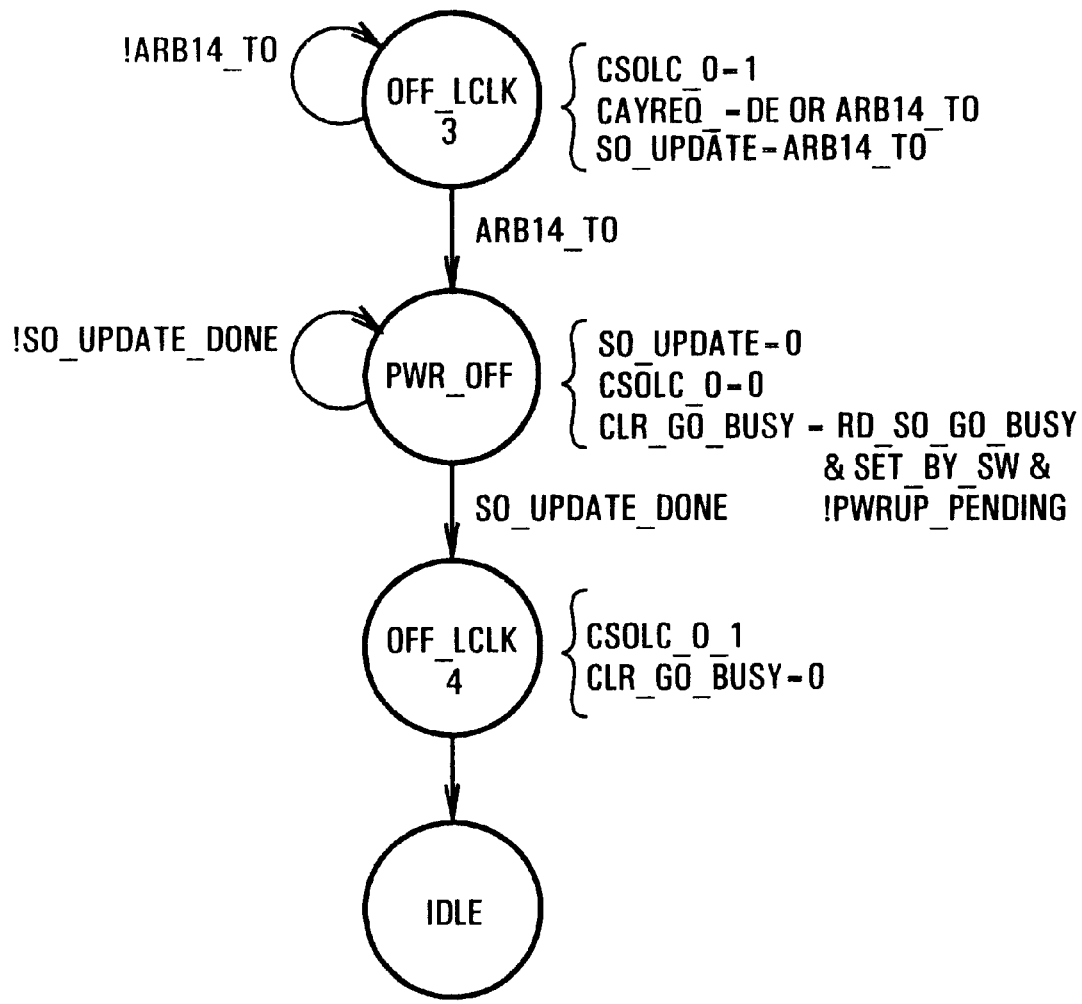
Figure 16D:
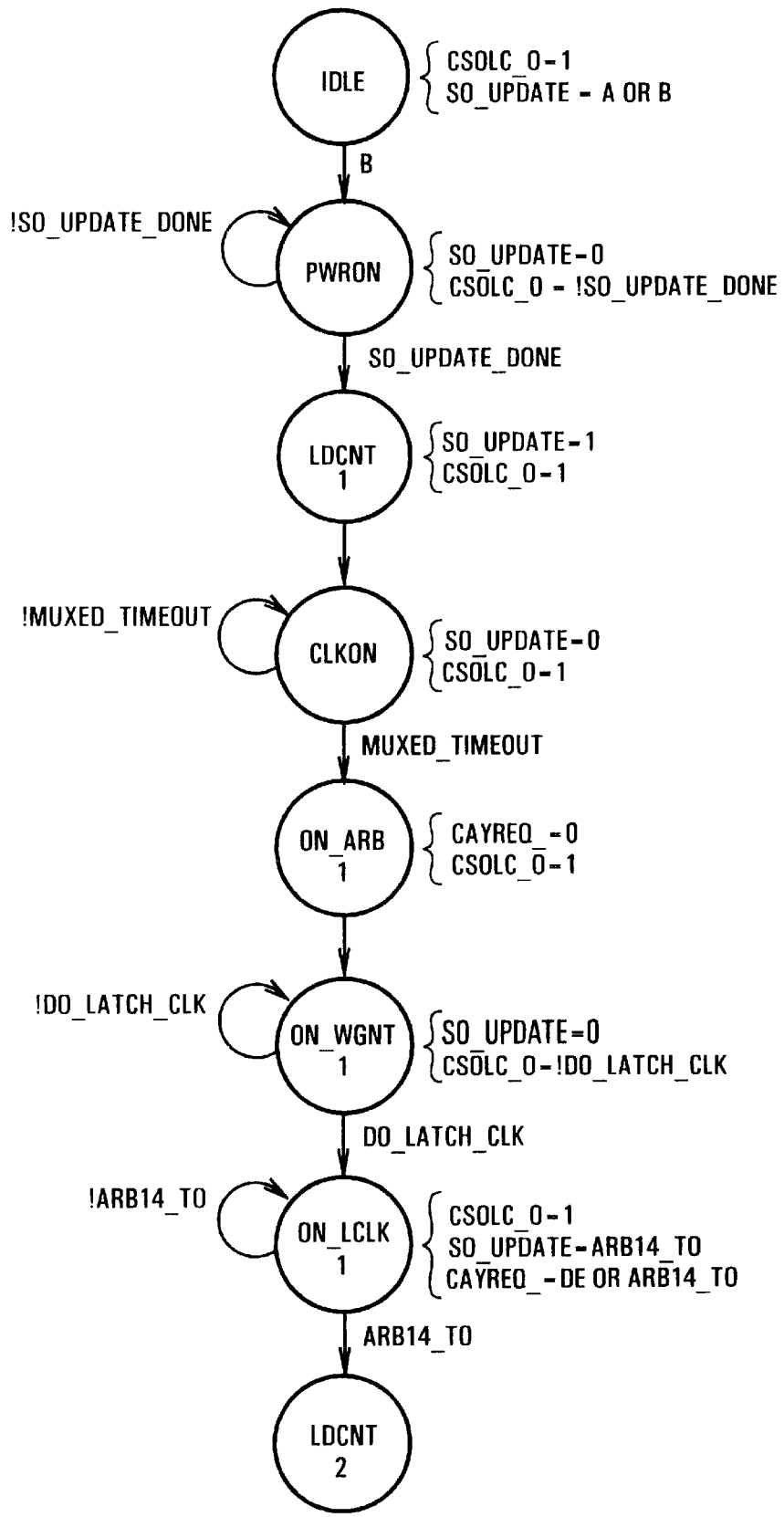
Figure 16E:
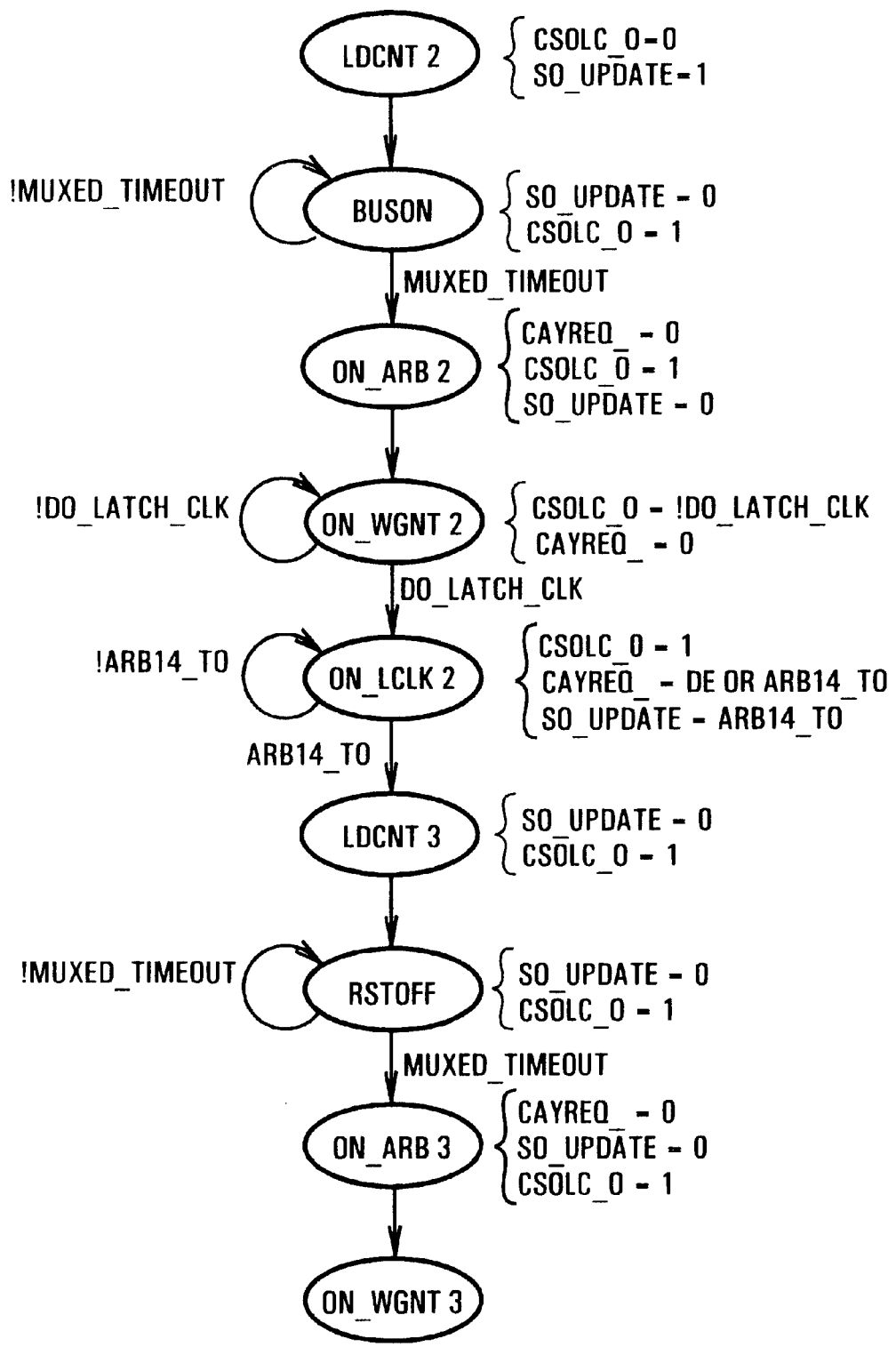
Figure 16F:
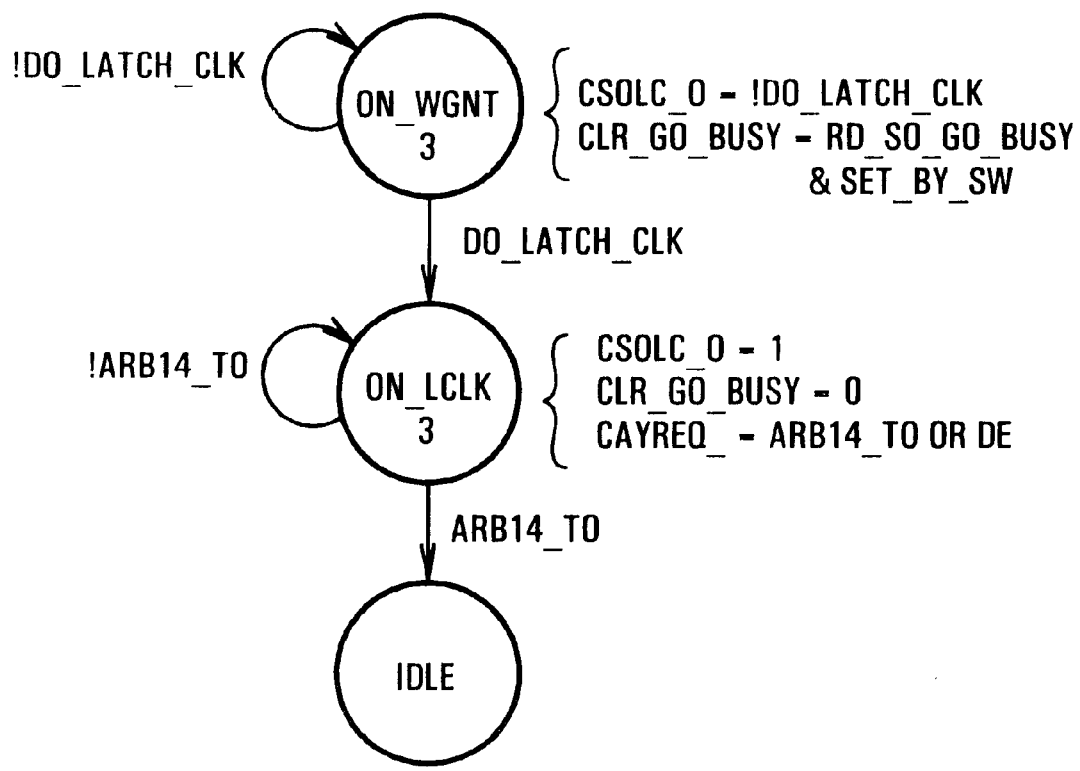

As shown in FIG. 14, the ON/OFF control logic 820 includes an ON/OFF state machine 998 which receives the signals RST_SWITCH[5:0], SLOT_EN[5:0] and SLOT_RST_[5:0]. Based on the conditions indicated by these signals, the ON/OFF state machine 998 indicates and controls the appropriate power up or power down sequences. The ON/OFF state machine 998 furnishes control signals to control logic 999.

The ON/OFF state machine 998 furnishes a serial output update signal SO_UPDATE to the serial output logic 824. When the signal SO_UPDATE is asserted, or driven high, the serial output logic 824 begins the shifting phase and serially shifts control data, via the signal CSOD_O, to the register 80. The serial output logic 824 indicates completion of the shifting phase by asserting a signal SO_UPDATE_DONE which is received by the ON/OFF state machine 998. The ON/OFF state machine 998 subsequently updates the control signals POUT[39:0] by negating, or clocking, the latch signal CSOLC_O which is received by the register 80.

The control logic 999 furnishes the signals PWREN[5:0], CLKEN#[5:0], BUSEN#[5:0] and RST#[5:0] to the serial output logic 824. The control logic 999 also furnishes a PCI bus request signal CAYREQ# which is received by the master interface 809b. The control logic 999 asserts the CAYREQ# signal to request ownership of the PCI bus 32. The master interface 809b receives the CAYREEQ# signal and asserts a GNT# line (assigned to the hot plug controller 50) on the bus 32 when the CAYREQ# signal is asserted. When the arbiter 27 grants ownership of the bus 32 to the controller 50 (as indicated by the assertion of a REQ# line assigned to the hot plug controller 50), the master interface 809b asserts a signal called CAYGNT# which is received by the control logic 999. The assertion of the CAYREQ# signal marks the beginning of the dummy bus cycle 200.

Referring to FIGS. 15 and 16A–F, the ON/OFF state machine 998 enters an idle state IDLE upon assertion of the reset signal RST. If not idle, the ON/OFF state machine 998 controls one of three sequences: the power down sequence, the power on sequence, or a one pass sequence (not shown). The one pass sequence is used to update the control signals POUT[39:0] as indicated by the slot enable 817 and LED control (not shown) registers.

The ON/OFF state machine 998 begins the power down sequence when either the software requests a power down of at least one of the slots 36, as indicated by the deassertion of the signals SLOT_EN[5:0] or the serial scan input logic 804 determines at least one of the slots 36a–f should undergo the power down sequence, as indicated by the assertion of the signals RST_SWITCH[5:0]. To begin the power down sequence, the ON/OFF state machine 998 asserts the SO_UPDATE signal to begin a shifting phase to reset selected card(s) 807 and transitions from the IDLE state to a RSTON state.

During the RSTON state, the control logic 999 negates the reset signals RST#[5:0] for the slots 36 that are to be powered down, and the serial output logic 824 serially shifts the reset signals RST#[5:0] to the output register 80. The ON/OFF state machine 998 also negates the signal SO_UPDATE. Once all forty-control signals are shifted by the serial output logic 824 to the register 80, as indicated by the assertion of the signal SO_UPDATE_DONE, the ON/OFF state machine 998 transitions from the RSTON state to an OFF_ARB1 state where the state machine 998 requests control of the secondary PCI bus 32 (by asserting the PCI request signal CAYREQ#).

The state machine 998 transitions from the OFF_ARB1 state to an OFF_WGNT1 state where the machine 998 waits for either the grant of the PCI bus 32 (as indicated by the assertion of the CAYGNT# signal) or the expiration of an arbiter timeout signal called ARB_TO. The deadman timer measures a predetermined window of time for the arbiter 27 to grant access to the bus 32. Once either the deadman timer expires or the controller 50 is granted control of the bus 32, the controller 50 begins the dummy bus cycle 200a (if the use of dummy cycles 200 is enabled by a configuration bit DE), and the state machine 998 transitions to a state called OFF_LCLK1. After being granted the bus 32, once any preexisting cycles on the bus 32 complete, the controller 50 furnishes the dummy bus cycle 200a (if the bit DE is set in the control register 814). In transitioning to the OFF_LCLK1 state, the state machine 998 drives low the CSOLC_O signal for one PCI clock cycle to latch in the new POUT[39:0] values in the output register 80 (i.e., to reset the selected card(s)).

The ON/OFF state machine 998 remains in the OFF_LCLK1 state for a predetermined number (e.g., 14) of PCI clock cycles to allow circuitry on the card 807 to fully reset. During this time, if the use of dummy cycles 200 is disenabled (as indicated by the configuration bit called DE), the state machine 998 asserts the CAYREQ# signal to request use of the bus 32. However, if the use of dummy cycles 200 is enabled, the state machine 998 keeps the CAYREQ# signal deasserted. After the predetermined number of clock cycles expires (as indicated by the assertion of a signal called ARB14_TO), the state machine 998 deasserts the CAYREQ# signal (if asserted) and transitions to a state called BUSOFF to update the register 80 with the values required to disconnect the bus 32 from the selected card(s) 807. In transitioning to the BUSOFF state, the state machine 998 asserts the SO_UPDATE signal for one PCI clock cycle to begin another shifting sequence to transfer the new POUT[39:0] values into the output register 80.

During the BUSOFF state, the control logic 999 deasserts, or drives high, the bus enable signals BUSEN#[5:0] for the slots 36 that are to be powered down, and the serial output logic 824 serially shifts the bus enable signals BUSEN#[5:0] to the output register 80. The ON/OFF state machine 998 also negates the signal SO_UPDATE and asserts the signal CSOLC_O. Once all forty-control signals are shifted by the serial output logic 824, as indicated by the assertion of the signal SO_UPDATE_DONE, the ON/OFF state machine 998 transitions from the BUSOFF state to an OFF_ARB2 state to request control of the PCI bus 32.

In the OFF_ARB2 state, the ON/OFF state machine 998 requests control of the secondary PCI bus 32 by asserting the request signal CAYREQ#. The ON/OFF state machine 998 then transitions to an OFF_WGNT2 state where the state machine 998 waits for the grant of the secondary PCI bus 32. When the arbiter 27 grants control of the bus 32 (as indicated by the assertion of the CAYGNT# signal) or when the arbitration deadman time expires (as indicated by the assertion of a signal called ARB_TO), the ON/OFF state machine 998 negates the signal CSOLC_O for one cycle of the signal CLK to update the control signals POUT[39:0] and transitions to an OFF_LCLK2 state. After being granted the bus 32, once any preexisting cycles on the bus 32 complete, the controller 50 furnishes the dummy bus cycle 200a (if the bit DE is set in the control register 814).

The ON/OFF state machine 998 remains in the OFF_LCLK2 state for a predetermined number (e.g., 14) of PCI clock cycles to allow circuitry on the card 807 to be fully reset. During this time, if the use of dummy cycles 200 is not enabled (as indicated by the configuration bit DE), the state machine 998 asserts the CAYREQ# signal to request use of the bus 32. However, if the use of dummy cycles 200 is enabled, the state machine 998 keeps the CAYREQ# signal deasserted. After the predetermined number of clock cycles expires (as indicated by the assertion of a signal called ARB14_TO), the state machine 998 deasserts the CAYREQ# signal (if asserted) and transitions to a state called CLK_OFF to update the register 80 with the values required to disconnect the PCI clock signal from the selected card(s) 807. In transitioning to the CLK_OFF state, the state machine 998 asserts the SO_UPDATE signal for one PCI clock cycle to begin another shift sequence to transfer the new POUT[39:0] values into the output register 80.

During the CLK_OFF state, the control logic 999 deasserts, or drives high, the clock enable signals CLKEN#[5:0] for the slots 36 that are to be powered down. The signals RST#[5:0] do not change, and the serial output logic 824 serially shifts the clock enable signals CLKEN#[5:0] to the output register 80. The ON/OFF state machine 998 also negates the signal SO_UPDATE. Once all forty control signals are shifted by the serial output logic 824, as indicated by the assertion of the signal SO_UPDATE_DONE, the ON/OFF state machine 998 transitions from the CLK_OFF state to an OFF_ARB3 state, where the state machine 998 once again requests control of the PCI bus 32 by asserting the CAYREQ# signal.

The state machine 998 then transitions from the OFF_ARB3 state to an OFF_WGNT3 state where the state machine 998 waits for either the grant of the PCI bus 32 or the expiration of the arbitration deadman timer. Once the grant is received or the arbitration deadman timer expires, the state machine 998 transitions to an OFF_LCLK3 state. After being granted the bus 32, once any preexisting cycles on the bus 32 complete, the controller 50 furnishes the dummy bus cycle 200a (if the bit DE is set in the control register 814).

The ON/OFF state machine 998 remains in the OFF_LCLK3 state for a predetermined number (e.g., 14) of PCI clock cycles to allow circuitry on the card 807 to become functional with the PCI clock signal. During this time, if the use of dummy cycles 200 is not enabled (as indicated by a configuration bit called DE), the state machine 998 asserts the CAYREQ# signal to request use of the bus 32. However, if the use of dummy cycles 200 is enabled, the state machine 998 keeps the CAYREQ# signal deasserted. After the predetermined number of clock cycles expires (as indicated by the assertion of a signal called ARB14_TO), the state machine 998 deasserts the CAYREQ# signal (if asserted) and transitions to a state called PWROFF to update the register 80 with the values required to remove power from the selected card(s) 807. In transitioning to the PWR_OFF state, the state machine 998 asserts the SO_UPDATE signal for one PCI clock cycle to begin another shift sequence to transfer the new POUT[39:0] values into the output register 80 and thus, begin another shifting phase.

During the PWROFF state, the control logic 999 deasserts, or dries low, the power enable signals PWREN[5:0] for the slots 36 that are to be powered down. The signals RST#[5:0], BUSEN#[5:0], and CLKEN#[5:0] do not change, and the serial output logic 824 serially shifts the power enable signals PWREN[5:0] to the output register 80. The ON/OFF state machine 998 also negates the signal SO_UPDATE. Once all forty control signals are shifted by the serial output logic 824, as indicated by the assertion of the signal SO_UPDATE_DONE, the ON/OFF state machine 998 transitions from the PWROFF state to an OFF_LCLK4 state where the signals POUT[39:0] are updated by negating the signal CSOLC_O for one cycle of the signal CLK. The state machine 998 then transitions to the IDLE state which completes the power down sequence.

If a power down sequence is not required, the ON/OFF state machine 998 determines if the power up sequence is required. If either the software has requested at least one of the slots 36 to powered up or a power up of the card platform 30 is pending, then the ON/OFF state machine 998 transitions from the IDLE state to a power on PWRON state to begin the power on sequence. To begin the power on sequence, the ON/OFF state machine 998 asserts the SO_UPDATE signal to begin a shift phase and transitions from the IDLE state to a power on state PWRON.

During the PWRON state, the control logic 999 asserts the power enable signals PWREN[5:0] for the card(s) 807 that are to be powered up, and the serial output logic 824 serially shifts the power enable signals PWREN[5:0] to the output register 80. The ON/OFF state machine 998 also negates the signal SO_UPDATE. Once all forty control signals are shifted by the serial output logic 824, as indicated by the assertion of the signal SO_UPDATE_DONE, the ON/OFF state machine 998 transitions from the PWRON state to a timer 806 initialization state LDCNT1, and during the transition, the state machine 998 negates the load signal CSOLC_O for one PCI clock cycle to update the control signals POUT[39:0].

In the LDCNT1 state, the ON/OFF state machine 998 initializes the timers 806 so that the timers 806 provide an indication when a predetermined stabilization delay interval has expired. The stabilization delay interval allows sufficient time for the card 807 that is being powered up to stabilize once the voltage level $V_{DD}$ is furnished to the card 807. In the LDCNT1 state, the ON/OFF state machine 998 asserts the signal CSOLC_O. The ON/OFF state machine 820 transitions from the LDCNT1 state to a CLKON state to provide the PCI clock signal to the selected card(s) 807.

During the CLKON state, the control logic 999 asserts, or drives low, the clock enable signals CLKEN#[5:0] for the slots 36 that are to be powered up. The PWREN[5:0] signals remain unchanged, and the serial output logic 824 serially shifts the clock enable signals CLKEN#[5:0] to the output register 80. The ON/OFF state machine 998 also negates the signal SO_UPDATE. Once a stabilization delay interval has expired, the ON/OFF state machine 998 transitions from the CLKOFF state to an ON_ARB1 state.

In the ON_ARB1 state, the ON/OFF state machine 998 requests control of the secondary PCI bus 32 by asserting the request signal CAYREQ# which begins the dummy cycle 200a (if enabled by the bit DE). The ON/OFF state machine 998 then transitions to an ON_WGNT1 state where the state machine 998 waits for the grant of the secondary PCI bus 32. When the arbiter 27 grants control of the bus 32 (as indicated by the assertion of the CAYGNT# signal) or when an arbitration deadman time expires (as indicated by the assertion of a signal called ARB_TO), the ON/OFF state machine 998 negates the signal CSOLC_O for one cycle of the signal CLK to update the control signals POUT[39:0] and transitions to an ON_LCLK2 state. After being granted the bus 32, once any preexisting cycles on the bus 32 complete, the controller 50 furnishes the dummy bus cycle 200a (if the bit DE is set in the control register 814).

The ON/OFF state machine 998 remains in the ON_LCLK1 state for a predetermined number (e.g., 14) of PCI clock cycles to allow circuitry on the card 807 to fully reset. During this time, if the dummy cycles 200 are not enabled (as indicated by a configuration bit called DE), the state machine 998 asserts the CAYREQ# signal to request use of the bus 32. However, if the dummy cycles 200 are enabled, the state machine 998 keeps the CAYREQ# signal deasserted. After the predetermined number of clock cycles expires (as indicated by the assertion of a signal called ARB14_TO), the state machine 998 deasserts the CAYREQ# signal (if asserted) and transitions to a state called LDCNT2 to initialize the timers 806 so that the timers 806 provide an indication when a predetermined stabilization delay interval has expired. In transitioning to the LDCNT2 state, the state machine 998 asserts the SO_UPDATE signal for one PCI clock cycle to begin another shift sequence to transfer the new POUT[39:0] values into the output register 80 and thus, begin another shifting phase. The state machine 998 transitions from the LDCNT2 state to the BUSON state where the output register 80 is updated with the values needed to connect selected card(s) 807 to communication lines of the bus 32.

During the BUSON state, the control logic 999 asserts, or drives low, the bus enable signals BUSEN#[5:0] for the slots 36 that are to be powered up. The signals CLKEN#[5:0] and PWREN[5:0] remain unchanged, and the serial output logic 824 serially shifts the bus enable signals BUSEN#[5:0] to the output register 80. The ON/OFF state machine 998 also negates the signal SO_UPDATE. Once a predetermined stabilization delay expires (a delay sufficient to allow all forty signals to be shifted out to the control register 80), the ON/OFF state machine 998 transitions from the BUSON state to an ON_ARB2 state where the state machine 998 once again requests control of the PCI bus 32 which begins the dummy bus cycle 200a (if enabled by the bit DE).

In the ON_ARB2 state, the ON/OFF state machine 998 requests control of the secondary PCI bus 32 by asserting the request signal CAYREQ# which begins the dummy cycle 200a (if enabled by the bit DE). The ON/OFF state machine 998 then transitions to an ON_WGNT2 state where the state machine 998 waits for the grant of the secondary PCI bus 32.

When the arbiter 27 grants control of the bus 32 (as indicated by the assertion of the CAYGNT# signal) or when the deadman time expires (as indicated by the assertion of a signal called ARB_TO), the ON/OFF state machine 998 negates the signal CSOLC_O for one cycle of the signal CLK to update the control signals POUT[39:0] and transitions to an ON_LCLK2 state. After being granted the bus 32, once any preexisting cycles on the bus 32 complete, the controller 50 furnishes the dummy bus cycle 200a (if the bit DE is set in the control register 814).

The ON/OFF state machine 998 remains in the ON_LCLK2 state for a predetermined number (e.g., 14) of PCI clock cycles to allow circuitry on the card 807 to become functional with the PCI bus signals. During this time, if the use of the dummy cycles 200 is not enabled (as indicated by a configuration bit called DE), the state machine 998 asserts the CAYREQ# signal to request use of the bus 32. However, if the use of the dummy cycles 200 is enabled, the state machine 998 keeps the CAYREQ# signal deasserted. After the predetermined number of clock cycles expires (as indicated by the assertion of a signal called ARB14_TO), the state machine 998 deasserts the CAYREQ# signal (if asserted) and transitions to a state called LDCNT3 to initialize the timers 806 so that the timers 806 provide an indication when a predetermined stabilization delay interval has expired. In transitioning to the LDCNT3 state, the state machine 998 asserts the SO_UPDATE signal for one PCI clock cycle to begin another shift sequence to transfer the new POUT[39:0] values into the output register 80 and thus, begin another shifting phase. The state machine 998 transitions from the LDCNT3 state to a RSTOFF state where the output register 80 is updated with the values needed to bring selected card(s) 807 out of reset.

During the RSTOFF state, the control logic 999 asserts, or negates, the reset signals RST#[5:0] for the slots 36 that are to be powered up, depending on their respective SLOT_RST_[5:0] signals. The signals CLKEN#[5:0], PWREN[5:0] and BUSEN#[5:0] remain unchanged, and the serial output logic 824 serially shifts the reset signals RST#[5:0] to the output register 80. The ON/OFF state machine 998 also negates the signal SO_UPDATE. During the RSTOFF state, the state machine 998 shifts all forty control signals via the serial output logic 824. Once a stabilization delay interval has expired, the ON/OFF state machine 998 transitions from the RSTOFF state to an ON_ARB3 state where the state machine 998 once again requests control of the PCI bus 32 and initiates the dummy bus cycle 200a (if the bit DE is set).

The ON/OFF state machine 998 then transitions to an ON_WGNT3 state where the state machine 998 waits for the grant of the secondary PCI bus 32. After being granted the bus 32, once any preexisting cycles on the bus 32 complete, the controller 50 furnishes the dummy bus cycle 200a (if the bit DE is set in the control register 814). If access is not granted by the arbiter 27 within a predetermined window of time, the ON/OFF state machine 998 proceeds to the IDLE state, which completes the power up sequence. When the arbiter 27 grants control of the bus 32 (as indicated by the assertion of the CAYGNT# signal) or when the deadman time expires (as indicated by the assertion of a signal called ARB_TO), the ON/OFF state machine 998 negates the signal CSOLC_O for one cycle of the signal CLK to update the control signals POUT[39:0] and transitions to the IDLE state, which completes the power up sequence.

Figure 17:
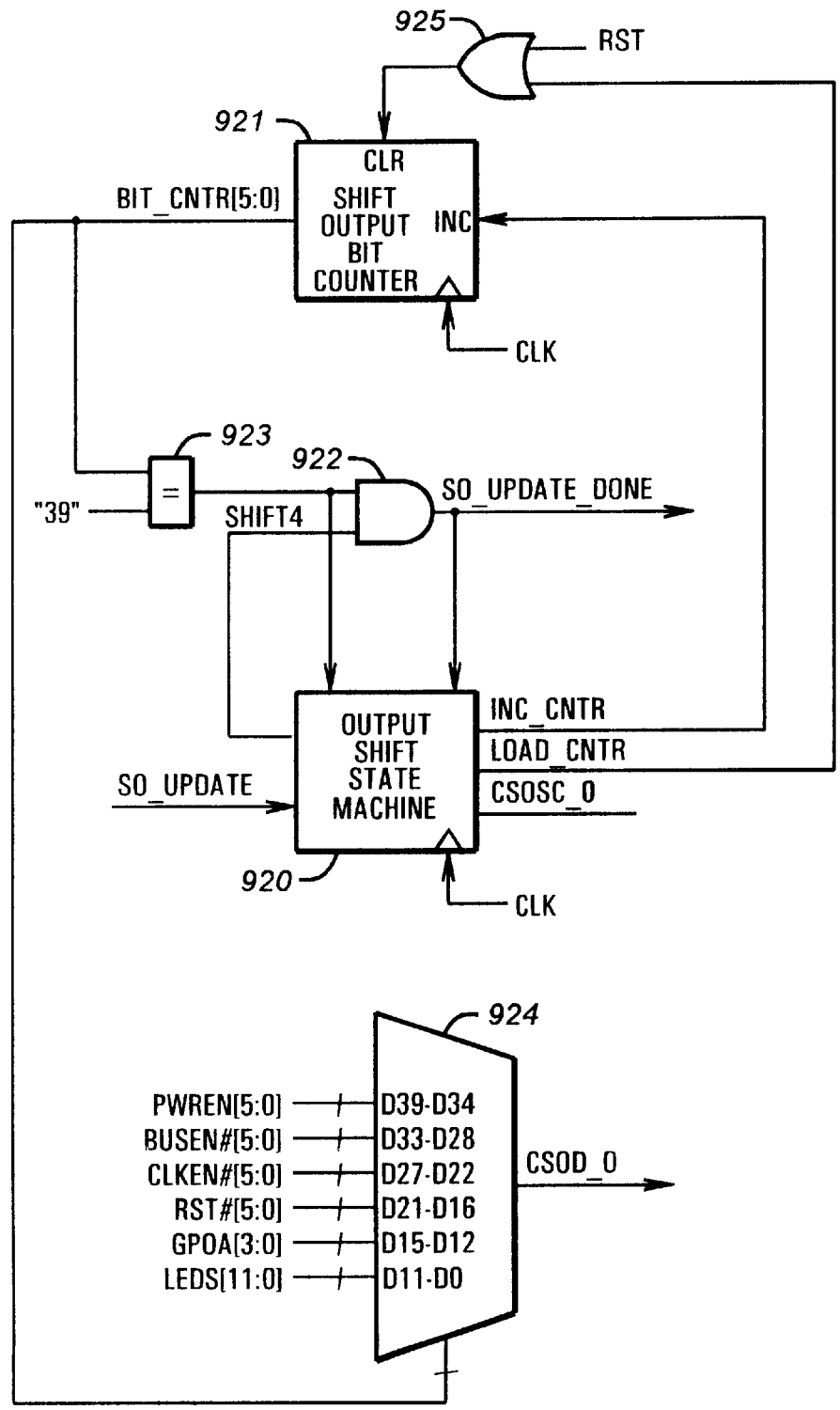
FIG. 17 is a schematic diagram of output logic of the hot plug controller.

As shown in FIG. 17, the serial output logic 824 includes a shift output bit counter 921 that provides a six bit counter output signal BIT_CNTR[5:0] which tracks the control signal shifted out of the serial output logic 824 via the signal CSOD_O. When the signal BIT_CNTR[5:0] is equal to a six digit number equivalent to "39" then a signal MAX_CNT is asserted. The signal MAX_CNT is provided to the input of an AND gate 922. The AND gate 922 further receives a signal SHIFT4 which is asserted when the output shift state machine 920 enters its SHIFT4 state, further described below. The output of the AND gate 922 provides the signal SO_UPDATE_DONE.

The output shift state machine 920 furnishes an increment counter signal INC_CNTR to the bit counter 921. When the INC_CNTR signal is asserted, the bit counter 921 increments the value represented by the signal BIT_CNTR[5:0]. When a load counter signal LOAD_CNTR is asserted or when the RST signal is asserted, then the output of an OR gate 925, connected to a clear input of the bit counter 921, clears the signal BIT_CNTR[5:0].

The signal BIT_CNTR[5:0] is furnished to the select input of a multi-bit multiplexer 924 that furnishes the signal CSOD_O. The zero through eleven inputs of the multiplexer 924 receive the LED control signals LEDS[11:0]. The twelve through fifteen inputs of the multiplexer 924 receive general purpose output signals GPOA[3:0]. The sixteen through twenty-one inputs receive the reset signals RST#[5:0]. The twenty-two through twenty-seven inputs receive the clock enable signals CLKEN#[5:0]. The twenty-eight through thirty-three inputs receive the bus enable signals BUSEN#[5:0]. The thirty-four through thirty-nine inputs receive the power enable signals PWREN[5:0].

Figure 19:
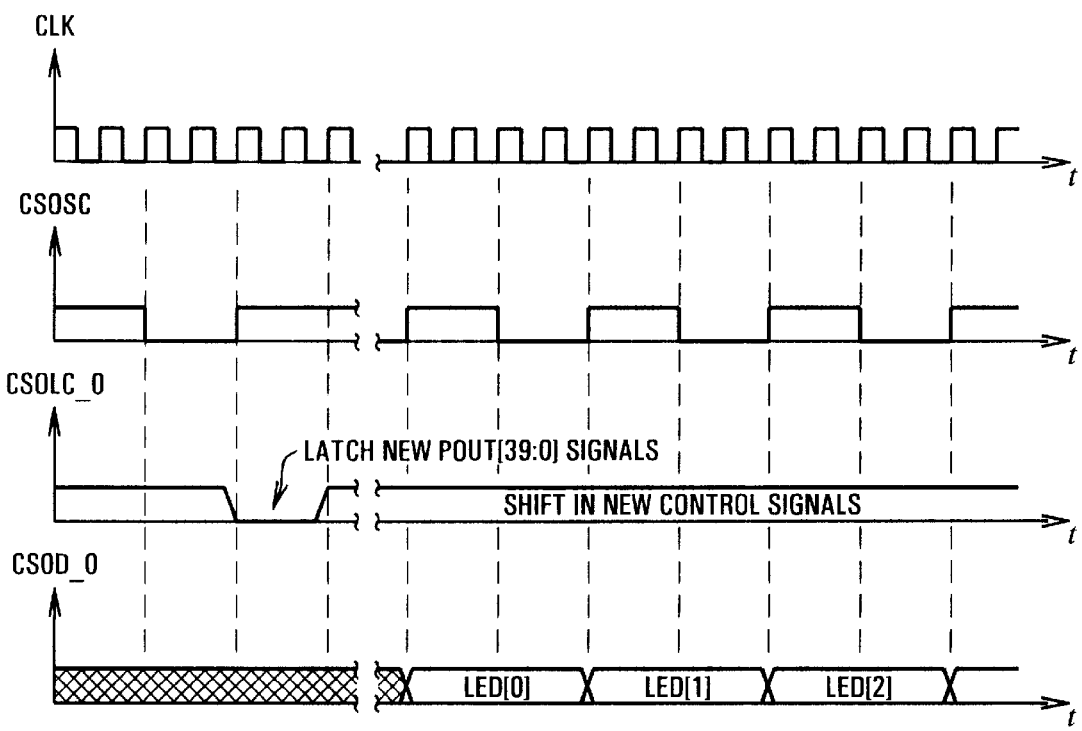
FIG. 19 shows waveforms of output signals of the hot plug controller.
Figure 18:
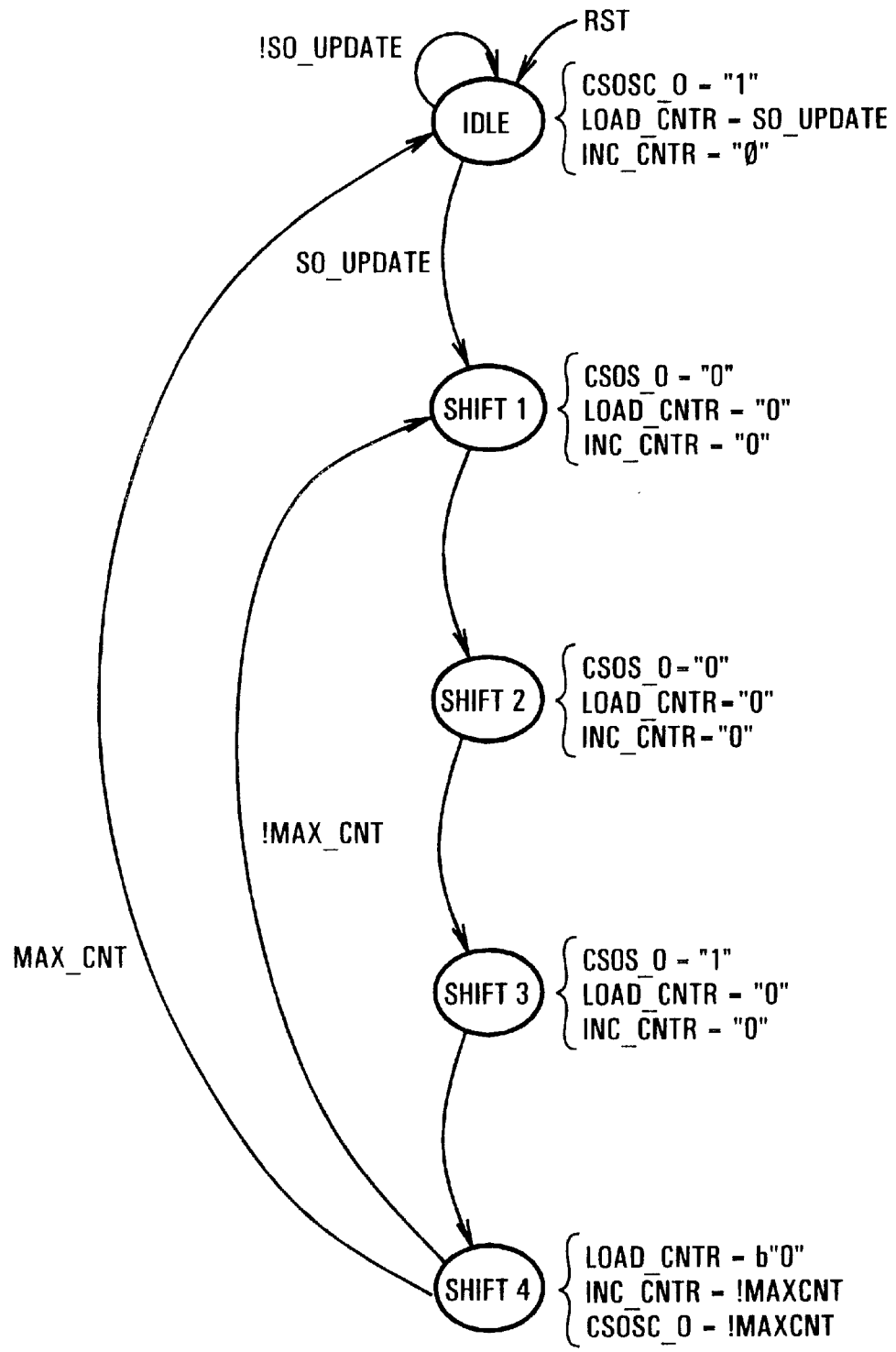
FIG. 18 is a state diagram illustrating operation of the output logic of FIG. 17.

As shown in FIGS. 18 and 19, the output shift state machine 920 enters an IDLE state when the signal RST is asserted. If the signal SO_UPDATE is asserted, then the output shift state machine 920 transitions from the IDLE state to a SHIFT1 state.

Because the output shift state machine 920 is clocked on the positive edge of the PCI clock signal CLK, the output shift state machine 920 transitions through a SHIFT1 state, a SHIFT2 state, a SHIFT3 state and a SHIFT4 state to generate the clock signal CSOSC_O that is one fourth of the frequency of the clock signal CLK. During the SHIFT1 and SHIFT2 states the clock signal CSOSC_O is negated, or low, and during the SHIFT3 and SHIFT4 states, the clock signal CSOSC_O is asserted, or high. When the current shift phase is completed, as indicated by the assertion of the signal MAXCNT, the shift state machine 920 returns to the IDLE state and the clock signal CSOSC_O is asserted until the beginning of the next shifting phase.

Figure 20:
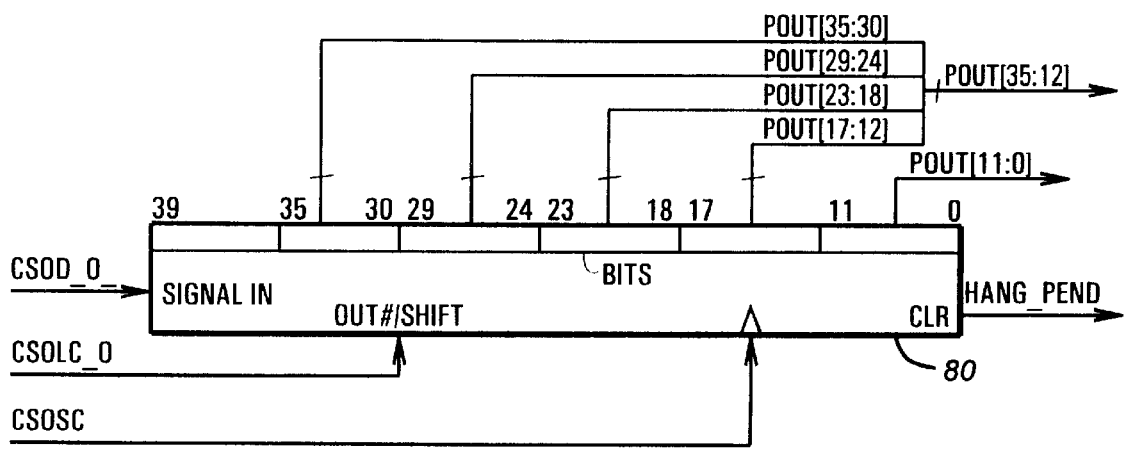
FIG. 20 is a schematic diagram of an output shift register of the hot plug controller.

As shown in FIG. 20, a HANG_PEND signal is received by the clear input of the register 80. The assertion, or driving high, or the HANG_PEND signal asynchronously clears the appropriate output control signals POUT[39:0] to power down all slots 36 when the PCI bus 32 is in a locked up condition.

Other embodiments are within the scope of the following claims.

What is claimed is:

1. A method for use with a computer system having a communication link on which communication occurs using communication cycles and a removable circuit card inserted into a connector, comprising:

changing an electrical connection state between the connector and the communication link; and in association with the changing, furnishing at least a portion of a predetermined communication cycle to the communication link.

2. The method of claim 1, wherein the predetermined communication cycle comprises a dummy cycle.

3. The method of claim 1, wherein the communication cycle is furnished from a circuit which is separate from the circuit card.

4. The method of claim 1, wherein the changing the electrical connection state comprises connecting the connector to the communication link.

5. The method of claim 4 wherein the connecting includes providing power to the connector.

6. The method of claim 4 wherein the connecting includes providing a clock signal to the connector.

7. The method of claim 4 wherein the connecting includes removing a reset signal from the connector.

8. The method of claim 1, wherein the changing the electrical connection state comprises disconnecting the connector from the communication link.

9. The method of claim 8 wherein the disconnecting includes removing power from the connector.

10. The method of claim 8 wherein the disconnecting includes removing a clock signal from the connector.

11. The method of claim 8 wherein the disconnecting includes providing a reset signal to the connector.

12. The method of claim 1, wherein
the communication link comprises a bus capable of being owned by one of more than one bus device,
the computer system is capable of granting ownership of the bus to one of the bus devices,
once granted ownership of the bus, the computer system monitors the bus for a predetermined sequence of signals and terminates ownership of the bus by the one of the bus devices if the predetermined sequence of signals is not detected, and
the predetermined communication cycle includes the predetermined sequence of signals.

13. The method of claim 1, wherein the computer system has an arbiter configured to control access to the communication link, further comprising:
requesting use of the link from the arbiter.

14. The method of claim 13 further comprising waiting to perform the furnishing until the arbiter grants use of the link.

15. The method of claim 13 further comprising:
if the arbiter does not grant use of the link, waiting to perform the furnishing until after a predetermined duration of time elapses from the requesting.

16. The method of claim 1, wherein the computer system has an arbiter configured to control access to the communication link, the method further comprising:
requesting use of the link from the arbiter;
waiting to perform the furnishing until the arbiter grants access to the link; and
if the arbiter does not grant use of the link, waiting to perform the furnishing until after a predetermined duration of time elapses from the requesting.

17. The method of claim 1 wherein the predetermined communication cycle includes an address.

18. The method of claim 1 wherein the predetermined communication cycle includes a command.

19. The method of claim 1 wherein the predetermined communication cycle includes data.

20. The method of claim 1, wherein
the computer system has a bus device configured to furnish a cycle to the communication link when the bus is idle, and
the predetermined communication cycle keeps the bus from being idle.

21. The method of claim 1, wherein
the communication link has a line for transmitting an address, the line having an unasserted logic level, and
the furnishing includes:
selecting the address so that the line remains at the unasserted logic level, and
providing the address to the line.

22. The method of claim 1 wherein the communication link comprises a bus.

23. A method for use with a computer system having a bus on which communication occurs using communication cycles and a removable circuit card inserted into a connector, comprising:
connecting a clock signal to the connector;
connecting signals of the bus to the connector;
in association with the connecting signals, furnishing a predetermined communication cycle to the bus;
removing a reset signal from the connector; and
in association with the removing, furnishing a second predetermined communication cycle to the bus.

24. A method for use with a computer system having a bus and a removable circuit card inserted into a connector, comprising:
disconnecting a clock signal from the connector;
disconnecting signals of the bus from the circuit card;
in association with the disconnecting signals, furnishing a predetermined communication cycle to the bus; and
connecting a reset signal to the connector.

25. A computer system comprising:
a communication link on which communication occurs using communication cycles;
a connector having electrical contacts corresponding to the communication link;
a removable circuit card inserted into the connector; and
a control circuit configured to:
change an electrical connection state between the connector and the communication link; and
in association with the change, furnish at least a portion of a predetermined communication cycle to the communication link.

26. The computer system of claim 25, wherein the predetermined communication cycle comprises a dummy cycle.

27. The computer system of claim 25, wherein the communication cycle is furnished from a circuit which is separate from the circuit card.

28. The computer system of claim 25, wherein the predetermined communication cycle includes an address.

29. The computer system of claim 25, wherein the predetermined communication cycle includes a command.

30. The computer system of claim 25, wherein the predetermined communication cycle includes data.

31. The computer system of claim 25, wherein the changing of the electrical state includes connecting the connector to the communication link.

32. The computer system of claim 31, wherein the control circuit is configured to connect the circuit card by at least providing power to the connector.

33. The computer system of claim 31, wherein the control circuit is configured to connect the circuit card by at least providing a clock signal to the connector.

34. The computer system of claim 31, wherein the control circuit is configured to connect the circuit card by at least removing a reset signal from the connector.

35. The computer system of claim 25, wherein the changing of the electrical state includes disconnecting the connector from the communication link.

36. The computer system of claim 35, wherein the control circuit is configured to disconnect the circuit card by at least removing power from the connector.

37. The computer system of claim 35, wherein the control circuit is configured to disconnect the circuit card by at least removing a clock signal from the connector.

38. The computer system of claim 35, wherein the control circuit is configured to connect the circuit card by at least providing a reset signal to the connector.

39. The computer system of claim 25, wherein the communication link comprises a bus capable of being owned by one of more than one bus device, the computer system is capable of granting ownership of the bus to one of the bus devices, once granted ownership of the bus, the computer system monitors the bus for a predetermined sequence of signals and terminates ownership of the bus by the one of the bus devices if the predetermined sequence of signals is not detected, and the predetermined communication cycle includes the predetermined sequence of signals.

40. The computer system of claim 25, further comprising:

an arbiter configured to control access to the communication link, and wherein the control circuit is further configured to request use of the link from the arbiter.

41. The computer system of claim 40, wherein the control circuit is further configured to wait to furnish the at least one portion until the arbiter grants use of the link.

42. The computer system of claim 25, wherein the control circuit is further configured to furnish the at least one portion if the arbiter does not grant use of the link after a predetermined duration of time elapses from when the control circuit requests use of the link.

43. The computer system of claim 25, further comprising:

an arbiter configured to control access to the communication link, and wherein the control circuit is further configured to:
request use of the link from the arbiter,
wait until the arbiter grants access to the link,
furnish the at least one portion of the predetermined communication cycle if the arbiter grants access to the link, and
if the arbiter does not grant access to the link after a predetermined duration of time expires from the request, furnish the at least one portion of the predetermined communication cycle.

44. The computer system of claim 25, further comprising:

a bus device configured to furnish a bus cycle to the communication link when the bus is idle, and the control circuit is further configured to furnish the at least one portion of the predetermined communication cycle by at least providing signals to the link that are not indicative of an idle bus.

45. The computer system of claim 25, wherein the communication link has a line for transmitting an address, the line having an unasserted logic level, and the control circuit is configured to furnish the at least one portion of the predetermined communication cycle by at least selecting the address so that the line remains at the unasserted logic level and providing the address to the line.

46. The computer system of claim 25, wherein the communication link comprises a bus.

47. A computer system comprising:

a bus on which communication occurs using communication cycles;

a connector having electrical contacts corresponding to the bus;

a removable circuit card inserted into the connector; and a control circuit configured to:
connect a clock signal to the connector,
connect one or more signals of the bus to the connector,
in association with the connection of the one or more signals, furnish a first predetermined communication cycle to the bus,
disconnect a reset signal from the connector, and
in association with the disconnection of the reset signal, furnish a second predetermined communication cycle to the bus.

48. A computer system comprising:

a bus on which communication occurs using communication cycles;

a connector having electrical contacts corresponding to the bus;

a removable circuit card inserted into the connector; and a control circuit configured to:
disconnect a clock signal from the connector,
disconnect one or more signals of the communication link from the connector,
in association with the disconnection of the one or more signals, furnish a predetermined communication cycle to the bus, and
connect a reset signal to the connector.

49. A method for use with a computer system having a bus comprised of a plurality of signals connectable to at least one connector, the plurality of signals each being connected to the connector in one state and disconnected from the connector in another state, the method comprising, providing at least a portion of a first predetermined bus cycle; and changing a connection state between the connector and the bus while the first predetermined bus cycle is provided.

50. The method of claim 49, further comprising the step of:

providing a reset signal to the connector before furnishing said first predetermined bus cycle.

51. The method of claim 50, further comprising the step of:

furnishing at least a portion of a second predetermined bus cycle to the connector while the reset signal is provided.

52. The method of claim 49, further comprising the step of:

removing power from the connector after the connection state between the connector and the bus is changed to a disconnect state.

53. The method of claim 52, further comprising the step of:

furnishing at least a portion of a third predetermined bus cycle to the connector while power is removed.

54. The method of claim 53, wherein the connector is capable of receiving a removable circuit card and the predetermined bus cycles are provided by circuitry other than the removable circuit card, the method further comprising the step of:

removing the removable circuit card after power is removed.

55. The method of claim 52, wherein the connector is capable of receiving a removable circuit card and the first predetermined cycle is provided by circuitry other than the removable circuit card, the method further comprising the step of:

removing the removable circuit card after power is removed.

56. The method of claim 49, further comprising the step of:

applying power to the connector before the connection state between the connector and the bus is changed to a connected state.

57. The method of claim 49, wherein the connector is capable of receiving a removable circuit card and the first predetermined bus cycle is provided by circuitry other than the removable circuit card, the method further comprising the step of:

inserting the removable circuit card before power is applied.

58. The method of claim 49, further comprising the step of:

negating a reset signal to the connector after furnishing said first predetermined bus cycle.

59. The method of claim 58, further comprising the step of:

furnishing at least a portion of a second predetermined bus cycle to the connector while the reset signal is negated.

60. The method of claim 49, wherein the connector is capable of receiving a removable circuit card and the first predetermined bus cycle is provided by circuitry other than the removable circuit card, the method further comprising the step of:

inserting the removable circuit card before the connection state between the connector and the bus is changed to a connected state.

61. The method of claim 49, wherein the connector is capable of receiving a removable circuit card and the first predetermined bus cycle is provided by circuitry other than the removable circuit card, the method further comprising the step of:

removing the removable circuit card after the connection state between the connector and the bus is changed to a disconnected state.

62. The method of claim 49, wherein the first predetermined bus cycle comprises a dummy cycle.

63. The method of claim 62, wherein the dummy cycle includes providing a FRAME signal.

\* \* \* \* \*